(12) United States Patent
Rick

(10) Patent No.: US 8,874,390 B2
(45) Date of Patent: Oct. 28, 2014

(54) INSTRUMENT AND METHOD FOR PROCESSING A DOPPLER MEASUREMENT SIGNAL

(75) Inventor: David Langley Rick, Longmont, CO (US)

(73) Assignee: Hach Company, Loveland, CO (US)

(*) Notice: Subject to any disclaimer, the term of this patent is extended or adjusted under 35 U.S.C. 154(b) by 520 days.

(21) Appl. No.: 13/069,729

(22) Filed: Mar. 23, 2011

(65) Prior Publication Data

US 2012/0245863 A1 Sep. 27, 2012

(51) Int. Cl.
G01F 17/00 (2006.01)
G01F 23/00 (2006.01)
G01L 7/00 (2006.01)
G01N 11/00 (2006.01)
G01F 15/06 (2006.01)
G01F 1/66 (2006.01)
G01F 1/00 (2006.01)
G01P 5/24 (2006.01)
G01S 15/58 (2006.01)

(52) U.S. Cl.
CPC .......... G01P 5/241 (2013.01); G01F 15/068 (2013.01); G01F 15/06 (2013.01); G01F 1/663 (2013.01); G01F 1/002 (2013.01); G01S 15/58 (2013.01)
USPC .............. 702/50; 342/192; 342/89; 342/91; 342/159; 342/175; 342/195; 342/196

(58) Field of Classification Search
USPC ........................................................ 702/50
See application file for complete search history.

(56) References Cited

U.S. PATENT DOCUMENTS

| 3,337,808 | A | * | 8/1967 | Kahn ............................. 455/222 |
| 3,940,731 | A | | 2/1976 | Cooper et al. |
| 3,946,418 | A | * | 3/1976 | Sigsbee et al. ................. 257/364 |
| 5,226,328 | A | * | 7/1993 | Petroff et al. ............... 73/861.25 |
| 5,226,420 | A | | 7/1993 | Peterson |
| 5,287,753 | A | * | 2/1994 | Routh et al. ............... 73/861.25 |
| 5,315,880 | A | | 5/1994 | Bailey |
| 5,371,886 | A | | 12/1994 | Britton et al. |
| 5,421,211 | A | | 6/1995 | Heckman |
| 5,557,536 | A | | 9/1996 | Nabity et al. |
| 5,579,768 | A | | 12/1996 | Klesenski |
| 5,633,809 | A | | 5/1997 | Wissenbach et al. |

(Continued)

OTHER PUBLICATIONS

Lenehan, Jim, "Flow Calculation Reference Manual", Monograph prepared for Hach Company, JBL Tech, Inc.

(Continued)

*Primary Examiner* — Tung S Lau
*Assistant Examiner* — Stephanie Chang
(74) *Attorney, Agent, or Firm* — Ference & Associates LLC

(57) ABSTRACT

An instrument (100) is provided according to an embodiment of the invention. The instrument (100) includes an interface (101) configured to receive a Doppler measurement signal and a processing system (112) coupled to the interface (101) and receiving the Doppler measurement signal. The processing system (112) is configured to generate a two-sided velocity spectrum including a plurality of discrete frequency bins from the Doppler measurement signal, with the two-sided velocity spectrum distinguishing spectral elements, and process one or more velocity spectrum bin pairs against a plurality of local gate thresholds, with the one or more velocity spectrum bin pairs being substantially symmetrically located about one or more carrier wave bins and wherein each velocity spectrum bin pair is processed against a corresponding local gate threshold of the plurality of local gate thresholds.

23 Claims, 17 Drawing Sheets

(56) References Cited

U.S. PATENT DOCUMENTS

| | | | |
|---|---|---|---|
| 5,777,592 | A | 7/1998 | Mihara et al. |
| 5,811,688 | A | 9/1998 | Marsh et al. |
| 5,821,427 | A | 10/1998 | Byrd |
| 5,966,090 | A * | 10/1999 | McEwan .................. 342/27 |
| 6,537,222 | B1 * | 3/2003 | Clark et al. .................. 600/458 |
| 7,249,730 | B1 | 7/2007 | Flippen, Jr. |
| 7,672,797 | B2 | 3/2010 | Petroff |
| 7,742,914 | B2 * | 6/2010 | Kosek et al. .................. 704/205 |
| 8,022,864 | B2 * | 9/2011 | Jordan et al. .................. 342/192 |
| 8,215,183 | B2 * | 7/2012 | Petroff .................. 73/861.28 |
| 2002/0126039 | A1 * | 9/2002 | Dalton et al. .................. 342/26 |
| 2003/0025486 | A1 | 2/2003 | Ellis et al. |
| 2003/0117311 | A1 * | 6/2003 | Funai .................. 342/26 |
| 2004/0122317 | A1 * | 6/2004 | Heim .................. 600/437 |
| 2004/0249284 | A1 * | 12/2004 | Vilkomerson .................. 600/453 |
| 2006/0079782 | A1 * | 4/2006 | Beach et al. .................. 600/450 |
| 2008/0047358 | A1 * | 2/2008 | Petroff .................. 73/861.27 |
| 2011/0019788 | A1 * | 1/2011 | Shibata .................. 375/371 |
| 2012/0245863 | A1 * | 9/2012 | Rick .................. 702/50 |
| 2013/0041600 | A1 * | 2/2013 | Rick .................. 702/50 |

OTHER PUBLICATIONS

Simon, Dan, Optimal State Estimation: Kalman, H8, and Nonlinear Approaches, Hoboken, John Wiley & Sons, 2006, ISBN 978-0-471-70858-2.

Percival, B.B., Walden, AT.T., Spectral analysis for physical applictions,: Multitaper and conventionall univariate techniques, Cambridge, Cambridge University press, 1993, ISBN: 0-5213-5532-X.

Julier, S.J.; Uhlmann, J.K., "Unscented filtering and nonlinear estimation," Proceedings of the IEEE, vol. 92, No. 3. pp. 401-422, Mar. 2004.

Julier,S.J.; Uhlmann, J.K., "Corrections to "Unscented Filtering and Nonlinear Estimation"," Proceedings of the IEEE, vol. 92, No. 12, pp. 1958-1958, Dec. 2004.

R. Van Der Merwe. Sigma-Point Kalman Filters for Probabilistic Inference in Dynamic State-Space Models, in workshop on Advances in Machine Learing, Montreal, Jun. 2003.

Thevanaz, P.; Blu, T.; Unser, M., "Interpolation revisited [medical images application],"Medical Imaging, IEEE Transactions on, vol. 19, No. 7, pp. 739-758, Jul. 2000.

Thevanaz, P.; Blu, T.; Unser, M., "Complete parameterization of piecewise polynomial interpolators according to degree, support, regularity, and order,"Image Processing, 2000. Proceedings, 2000 International Conference on, vol. 2, no., pp. 335-338 vol. 2, 2000.

Bak, Thomas, "Lecture Notes—Estimation and Sensor Information Fusion", Aalborg University, Department of Control Engineering, Nov. 14, 2000.

Unser, M.; Aldroubi, A.; Eden, M., "B-spline signal processing. I. Theory,"signal Processing, IEEE Transactions on [see also Acoustics, Speech, and signal Processing, IEEE Transactions on], vol. 41, No. 2, pp. 821-833, Feb. 1993.

Unser, M.; Aldroubi, A.; Eden, M., "B-splinesignal processing. II. efficiency design and applications,"Sigani Processing, IEEE Transactions on [see also Acoustics, Speech, and Signa[ Processing, IEEE Transacions on], vol. 41 No. 2. pp. 834-848, Feb. 1993.

* cited by examiner

HARD THRESHOLDING

FIRST SOFT THRESHOLDING EMBODIMENT

SECOND SOFT THRESHOLDING EMBODIMENT

 GLOBAL SQUELCH THRESHOLD 
FIG. 6A                FIG.6B
 GLOBAL SQUELCH THRESHOLD 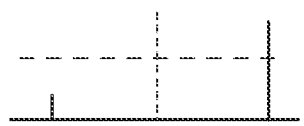
FIG .7A                FIG.7B
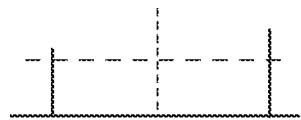 GLOBAL SQUELCH THRESHOLD 
FIG. 8A                FIG.8B

LOCAL GATE THRESHOLD

LOCAL GATE THRESHOLD

LOCAL GATE THRESHOLD

ILLUSTRATING ALIAS PROBLEMS IN
ONE-SIDED DOPPLER INSTRUMENTS

INSTRUMENT AND METHOD FOR PROCESSING A DOPPLER MEASUREMENT SIGNAL

BACKGROUND OF THE INVENTION

1. Field of the Invention

The invention is related to the field of Doppler measurements, and in particular, to processing a Doppler measurement signal.

2. Statement of the Problem

Instruments exist which measure fluid velocity by emitting an ultrasonic carrier signal that echoes off particulate matter carried in or on a flowing liquid and returns with its mean frequency shifted by the Doppler Effect. Other instruments use microwave energy, and it is believed that Doppler-shifted return energy is due to Bragg scattering. One common usage for such instruments is in the measurement of open-channel flow, as for instance in a wastewater collection sewer. Instruments of this type estimate fluid velocity from the observed Doppler frequency shift.

The Doppler shift can comprise a shift in a frequency of the reflected signal versus the originally transmitted signal, due to motion of an object toward or away from the Doppler transmitter device. The Doppler shift can be subsequently processed to determine the velocity. Further, the change in frequency of the reflected signal can be used to determine the direction of motion of the object, either toward or away from the Doppler measurement device.

In the measurement of fluid flow, a Doppler shift can be measured using continuous or pulsed waves transmitted through a fluid in order to detect a fluid velocity of the fluid flow. Consequently, the waves can be transmitted from within the fluid, including parallel to or at an angle from the fluid surface. Alternatively, microwave radio energy may be transmitted through the air above a fluid, impinging upon the fluid surface at an acute angle. A Doppler shift can be measured in the energy reflected from the fluid surface.

The Doppler measurements can detect and quantify a fluid velocity by measuring a movement of particles or reflectors in the fluid, such as foreign matter, air bubbles, or a movement of microwave reflectors at the fluid surface.

Various methods exist for processing of the returned signal, but most involve some type of spectral analysis. Typically, the normalized power spectral density (PSD) of the returned signal is used as a surrogate for the probability density function (PDF) that describes aggregate particle velocities. In some instruments, the magnitude spectrum of the returned signal is used instead of the power spectrum. The magnitude spectrum and the power spectrum are two types of velocity spectra. The velocity spectrum is then used to estimate mean velocity, peak velocity, maximum-likelihood velocity, or some other statistic that is relevant to flow.

In cases where the return signal is converted to digital form, it is well known that the required spectral analysis can be done using smoothed or averaged periodograms Smoothing and/or averaging is done to reduce/eliminate noise and outlier spikes in the computed spectrum. Computational efficiency is improved by use of the Fast Fourier Transform (FFT). The velocity spectrum is thus estimated at a discrete set of frequencies or bins. A back-end algorithm processes the bin values to obtain the desired flow statistic.

From the foregoing, it will be understood that it is common practice to analyze the reflected signals in the frequency domain, and frequency domain analysis is essential in estimating and processing a velocity spectrum. Frequency domain analysis at frequencies distinct from the carrier frequency will reveal a Doppler measurement response amplitude representing the Doppler shift in the reflection from the fluid. The fluid velocity is related to the amount of Doppler shift in the reflected carrier wave, wherein a large fluid velocity will result in a large shifted distance from the carrier frequency. The position of the reflected (and shifted) carrier wave with respect to the original carrier frequency is related to the velocity and direction of the fluid flow.

A two-sided velocity spectrum will often contain two obvious peaks, as is shown in FIG. 2. The central peak is associated with non-Doppler-shifted carrier wave energy. The carrier peak is central in the two-sided case. For a one-sided spectrum, the carrier peak is typically at the left side of the spectrum. The carrier wave energy is present in the return signal due to some combination of crosstalk and reflection from stationary objects, such as a flow channel boundary or other boundary surface. The carrier peak will frequently be the highest peak in the velocity spectrum and will be comparatively narrow. The other peak will represent the measurement reflection obtained from (and representative of) the fluid flow. The location of this peak will depend on the speed and direction of the fluid flow. A fluid flow in the opposite direction will be on the other side of the central peak. In either case, a faster fluid flow will always be located farther from the carrier peak.

Many instruments utilize a one-sided velocity spectrum. In these instruments, the carrier peak may be at the left-most edge of the spectrum and the flow peak will be to its right, regardless of the actual flow direction.

However, there are some difficulties in processing a Doppler measurement signal in order to generate the fluid velocity measurement. For example, noise will always be present in any measurement system. Also, the Fourier Transform itself is prone to spurious frequency spikes due to the "long tailed" statistics of the bin values. As a result, there will typically be noise artifacts in the resulting frequency spectrum. In addition, the Doppler transmitter may receive waves that are reflected from other objects, such as signals reflected from sides or boundaries of the fluid channel, from stationary objects within the flow, etc. In addition, the original transmitted carrier wave will be immediately received by the Doppler instrument and will present a very strong reflection signal in the frequency domain and substantially at the carrier wave frequency, potentially dominating the frequency spectrum. These various artifacts may make it difficult to discriminate the desired Doppler velocity measurement. All of these various artifacts need to be detected and/or removed from the signal in order to ensure that the resulting velocity measurement is accurate.

It can be observed in FIG. 2 that the estimated velocity spectrum has a non-zero noise floor. Noise may interfere with the determination of the statistic or measurement of interest. For example, it is difficult to determine the maximum flow velocity due to noise in the adjacent frequency bins. The calculation of mean velocity is corrupted by both noise and by the carrier peak. Accordingly, it is desirable to remove noise and crosstalk from the estimated spectrum prior to computing the flow statistics of interest.

In the prior art, U.S. Pat. No. 5,557,536 to Nabity et al. discloses a flow measurement system using submerged ultrasonic transducers to obtain a Doppler-shifted return signal. The return signal is digitized using complex sampling at the carrier rate, and the resultant samples are processed by means of an FFT to obtain an estimated Doppler spectrum. The statistic employed in Nabity is an "average velocity" which is apparently the centroid of the power spectrum, wherein the frequency bins are processed in order to determine a centroid of the entire result (possibly including spurious signals). This is in contrast to an earlier patent by Nabity, U.S. Pat. No. 5,371,686. The claims in the earlier Nabity patent are consistent with use of the magnitude spectrum of the reflected carrier wave.

In the prior art, U.S. Pat. No. 5,821,427 to Byrd discloses a flow measurement system using submerged ultrasonic transducers to obtain a Doppler-shifted return signal. A one-sided spectral estimate is computed by means of an FFT. The technique employed is maximum velocity and the back-end algorithm attempts to improve the estimation of this technique through least-squares curve fitting of the power spectrum.

In the prior art, U.S. Pat. No. 5,315,880 to Bailey discloses a flow measurement system which projects microwave radar energy at the top surface of an open channel. Doppler-shifted microwave energy is reflected back to a radar velocity sensor. Those skilled in the art will recognize that a velocity spectrum may be measured by Bailey and the bin values of the resulting velocity spectrum may be processed in order to derive some statistic related to flow velocity.

In the prior art, U.S. Pat. No. 5,811,688 to Marsh discloses an instrument similar to that described by Bailey. This instrument is known to use a one-sided FFT. This patent does not disclose how the Doppler estimate is obtained, although the instrument diagnostics and manual make it clear that a one-sided FFT technique is used.

In the prior art, U.S. Pat. No. 5,421,211 to Heckman discloses a squelch threshold set 40 dB below the spectral maximum value. Presumably, this is done in hopes of removing noise prior to subsequent calculations.

In the prior art, U.S. Pat. No. 5,226,328 to Petroff discloses the use of smoothing on a two-sided FFT. However, no beneficial use is made of the FFT's two-sidedness.

In U.S. Pat. No. 7,672,797 to Petroff, hereby incorporated by reference in its entirety, discloses a method of using a non-flow side of a two-sided Doppler measurement spectrum for the purpose of establishing the direction of flow and to produce a noise estimate used in a subsequent thresholding. However, this patent does not address the problem of removing substantially symmetric spectral artifacts, as provided by the present patent application. Furthermore, the patent does not teach the symmetric application of thresholding as provided by the present patent application.

ASPECTS OF THE INVENTION

In one aspect of the invention, an instrument comprises:
an interface configured to receive a Doppler measurement signal; and
a processing system coupled to the interface and receiving the Doppler measurement signal, with the processing system being configured to generate a two-sided velocity spectrum including a plurality of discrete frequency bins from the Doppler measurement signal, with the two-sided velocity spectrum distinguishing spectral elements, and process one or more velocity spectrum bin pairs against a plurality of local gate thresholds, with the one or more velocity spectrum bin pairs being substantially symmetrically located about one or more carrier wave bins and wherein each velocity spectrum bin pair is processed against a corresponding local gate threshold of the plurality of local gate thresholds.

Preferably, the processing system is further configured to process the one or more velocity spectrum bin pairs against a global squelch threshold, wherein if both bin amplitudes of a bin pair are less than the global squelch threshold, then both bin amplitudes of the bin pair are zeroed out and wherein if at least one bin amplitude of a bin pair exceeds the global squelch threshold, then both bin amplitudes of the bin pair are unchanged.

Preferably, the processing system is further configured to process the one or more velocity spectrum bin pairs against a global squelch threshold and with the global squelch threshold being substituted for a local gate threshold of the plurality of local gate thresholds if the global squelch threshold is greater than the local gate threshold.

Preferably, a local gate threshold of the plurality of local gate thresholds is a smaller value of left and right bin amplitudes of a bin pair.

Preferably, a local gate threshold of the plurality of local gate thresholds is derived from a smaller bin amplitude of left and right bin amplitudes of a bin pair, wherein the smaller bin amplitude is multiplied by a predetermined multiplier factor k to form the local gate threshold.

Preferably, a local gate threshold of the plurality of local gate thresholds is derived from a smaller bin amplitude of left and right bin amplitudes of a bin pair, wherein the local gate threshold is further averaged with weighted values of one or more predetermined nearby local gate thresholds.

Preferably, a smaller bin amplitude of a bin pair is zeroed out and wherein if a larger bin amplitude exceeds the local gate threshold, then the larger bin amplitude is unchanged.

Preferably, a smaller bin amplitude of a bin pair is zeroed out and wherein if a larger bin amplitude exceeds the local gate threshold, then the larger bin amplitude is reduced by the smaller bin amplitude.

Preferably, if both bin amplitudes of a bin pair are less than the local gate threshold, then both bin amplitudes of the bin pair are reduced or zeroed out.

Preferably, the processing system is further configured to zero out an isolated bin according to an isolated bin removal rule.

In one aspect of the invention, a method for processing a Doppler measurement signal comprises:
generating a two-sided velocity spectrum including a plurality of frequency bins from the Doppler measurement signal and with the two-sided velocity spectrum distinguishing spectral elements; and
processing one or more velocity spectrum bin pairs against a plurality of local gate thresholds, with the one or more velocity spectrum bin pairs being substantially symmetrically located about one or more carrier wave bins and wherein each velocity spectrum bin pair is processed against a corresponding local gate threshold of the plurality of local gate thresholds.

Preferably, further comprising processing the one or more velocity spectrum bin pairs against a global squelch threshold, wherein if both bin amplitudes of a bin pair are less than the global squelch threshold, then both bin amplitudes of the bin pair are zeroed out and wherein if at least one bin amplitude of a bin pair exceeds the global squelch threshold, then both bin amplitudes of the bin pair are unchanged.

Preferably, further comprising processing the one or more velocity spectrum bin pairs against a global squelch threshold and with the global squelch threshold being substituted for a local gate threshold of the plurality of local gate thresholds if the global squelch threshold is greater than the local gate threshold.

Preferably, a local gate threshold of the plurality of local gate thresholds being a smaller value of left and right bin amplitudes of a bin pair.

Preferably, a local gate threshold of the plurality of local gate thresholds being derived from a smaller bin amplitude of left and right bin amplitudes of a bin pair, wherein the smaller bin amplitude is multiplied by a predetermined multiplier factor k to form the local gate threshold.

Preferably, a local gate threshold of the plurality of local gate thresholds being derived from a smaller bin amplitude of left and right bin amplitudes of a bin pair, wherein the local gate threshold is further averaged with weighted values of one or more predetermined nearby local gate thresholds.

Preferably, a smaller bin amplitude of a bin pair is zeroed out and wherein if a larger bin amplitude exceeds the local gate threshold, then the larger bin amplitude is unchanged.

Preferably, a smaller bin amplitude of a bin pair is zeroed out and wherein if a larger bin amplitude exceeds the local gate threshold, then the larger bin amplitude is reduced by the smaller bin amplitude.

Preferably, if both bin amplitudes of a bin pair are less than the local gate threshold, then both bin amplitudes of the bin pair are reduced or zeroed out.

Preferably, further comprising zeroing out an isolated bin according to an isolated bin removal rule.

In one aspect of the invention, a method for processing a Doppler measurement signal comprises:
generating a two-sided velocity spectrum including a plurality of frequency bins from the Doppler measurement signal and with the two-sided velocity spectrum distinguishing spectral elements;
processing one or more velocity spectrum bin pairs against a global squelch threshold, with the one or more velocity spectrum bin pairs being substantially symmetrically located about one or more carrier wave bins; and
processing the one or more velocity spectrum bin pairs against a plurality of local gate thresholds, wherein each velocity spectrum bin pair is processed against a corresponding local gate threshold of the plurality of local gate thresholds.

Preferably, further comprising substituting the global squelch threshold for a local gate threshold of the plurality of local gate thresholds if the global squelch threshold is greater than the local gate threshold.

Preferably, further comprising zeroing out an isolated bin according to an isolated bin removal rule.

DESCRIPTION OF THE DRAWINGS

The same reference number represents the same element on all drawings.

FIG. 6A shows an example bin pair before a global squelch thresholding operation, where both the left bin amplitude and the right bin amplitude are less than the global squelch threshold.

FIG. 6B shows the bin pair where both the left bin amplitude and the right bin amplitude have been zeroed out for failing to exceed the global squelch threshold.

FIG. 7A shows an example bin pair before a global squelch thresholding operation, where the left bin amplitude is less than the global squelch threshold and the right bin amplitude exceeds the global squelch threshold.

FIG. 7B shows the bin pair unchanged, as the global squelch processing will not zero out a single bin and create an asymmetry in the bin pair.

FIG. 8A shows an example bin pair before a global squelch thresholding operation, where both the left bin amplitude and the right bin amplitude exceed the global squelch threshold.

FIG. 8B shows the bin pair unchanged.

FIG. 20($b$) is a spectrum showing isolated bin removal.

DETAILED DESCRIPTION OF THE INVENTION

FIGS. 1-20 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
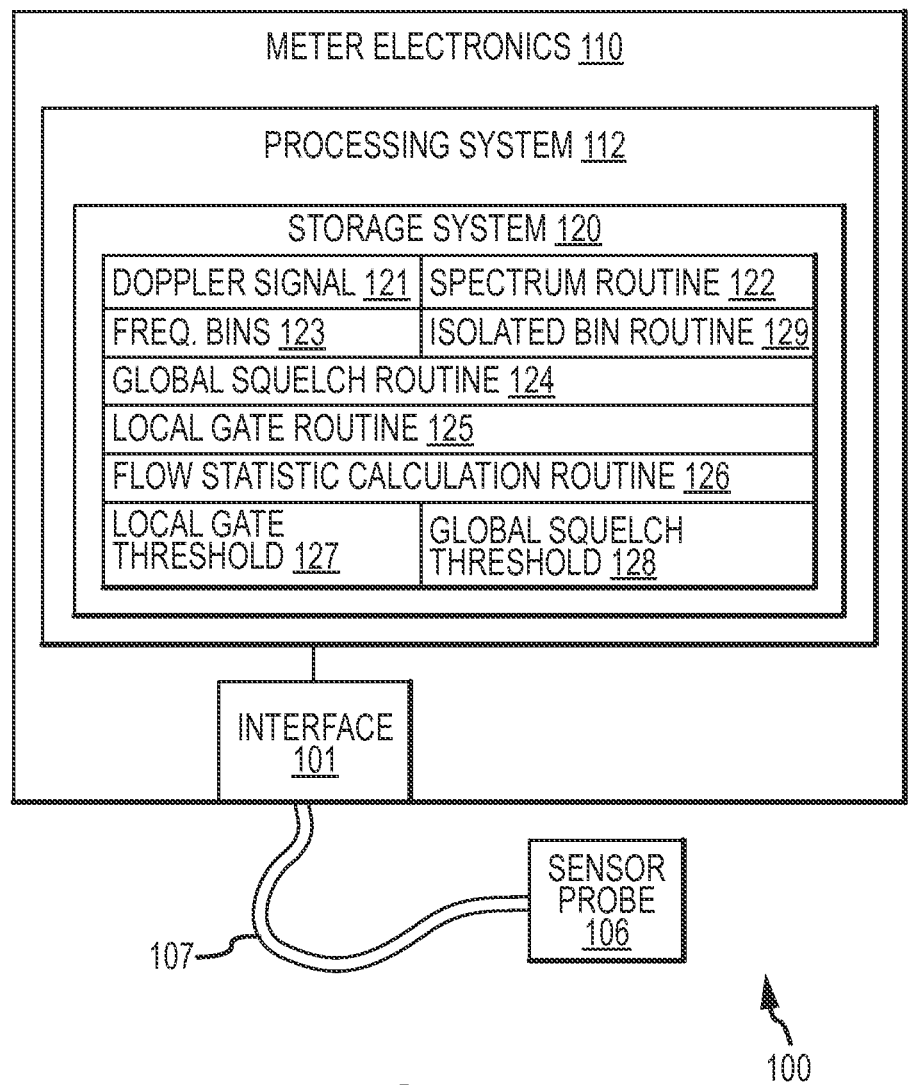
FIG. 1 shows a Doppler measurement instrument according to an embodiment of the invention.

FIG. 1 shows a Doppler measurement instrument 100 according to an embodiment of the invention. The Doppler measurement instrument 100 includes meter electronics 110 and a sensor probe 106 coupled to the meter electronics 110 via a cable 107 or other signal transmission apparatus. The meter electronic 110 generates a signal (i.e., a carrier wave) that is transmitted into the fluid and that is suited to obtaining a Doppler response due to the fluid and/or objects in the fluid. The sensor probe 106 can be placed into a fluid or a fluid flow and can generate a Doppler measurement signal to the meter electronics 110. The meter electronic 110 receives and processes the Doppler measurement signal in order to generate one or more Doppler measurement values, such as a fluid flow velocity, for example. Alternatively, the Doppler measurement value can comprise any manner of velocity measurement. The fluid can comprise any manner of liquid or gas.

The Doppler measurement instrument 100 can comprise either an intrusive or a non-intrusive instrument, wherein electromagnetic or acoustic waves interact with the fluid being measured. The Doppler measurement instrument 100 can additionally measure or determine other fluid characteristics, such as a fluid volume flow rate, for example, wherein the fluid flow velocity is used to derive the fluid volume flow rate.

The meter electronics 110 includes an interface 101 and a processing system 112 coupled to the interface 101. The interface 101 is configured to receive the Doppler measurement signal from the sensor probe 106 and relay it to the processing system 112. In addition, the interface 101 can perform any manner of pre-processing operations, such as digitizing the measurement signal, for example. Further, the interface 101 can perform any manner of pre-amplification or filtering, as desired. In some cases, pre-amplification and digitizing functions can reside in the sensor probe.

The processing system 112 is configured to receive the Doppler measurement signal from the interface 101. The processing system 112 can perform a Fourier Transform on the digitized Doppler measurement signal in order to convert the measurement signal into the frequency domain from the time domain. The processing system 112 can center the two-sided velocity spectrum on one or more carrier wave bins before processing any velocity spectrum bin pairs. The Fourier Transform processing can perform the centering in some embodiments. The Fourier Transform can comprise a Fast Fourier Transform (FFT) or Discrete Fourier Transform (DFT) or any suitable Fourier transform method. The complex numbers at the output of the Fourier Transform are converted to real numbers by taking their magnitude or squared magnitude. The result is a frequency spectrum including a plurality of discrete frequency bins. Other methods of estimating a frequency spectrum are possible and are within the scope of the description and claims. For example, the estimations can be achieved using filter banks or using auto-regressive moving average (ARMA) modeling or other parametric spectral estimate tools or routines.

The number of frequency bins can be chosen as needed or desired. The resulting frequency spectrum will contain a Doppler measurement response that is obtained from the fluid, wherein a Doppler shift from the original (i.e., carrier) waveform is related to the velocity of the fluid. However, the frequency spectrum may also exhibit noise artifacts and unwanted signal reflections.

In comparison, the majority of known prior art appears to perform only one-sided spectral processing. In the one case where a two-sided velocity spectrum is calculated, no beneficial use is made of it to reduce spectral artifacts. The prior art requires separate processing for determining flow direction. The prior art may not even determine flow direction. The prior art employs a conventional squelch algorithm, wherein each frequency bin is compared to a squelch threshold and the bin value is removed if it is less than the squelch threshold. The prior art does not take noise or carrier leakage out of signal bins prior to determining a Doppler reflection signal or prior to determining an offset distance of a Doppler reflection signal from a carrier wave.

In contrast, the present processing uses both sides of a two-sided velocity spectrum in order to determine which frequency bins contain valuable information and which frequency bins can be reduced or zeroed out. This enhances the ability to distinguish the Doppler reflection signal in the velocity spectrum. The processing may also serve to reduce overall computation time.

This advantageously provides a better result at low flow speeds. It provides a better result when the Doppler reflection signal is close to the carrier wave. Consequently, the processing herein can better discriminate the Doppler reflection from both noise and the carrier wave.

Although the mirror-image thresholding algorithm is focused on removal of symmetrical spectral artifacts, it is likely that the spectrum to be processed also contains artifacts which are non-symmetrical. These may be noise artifacts which are asymmetrical by chance or they may be distortion and/or aliasing artifacts which happen to be non-symmetrical. Whatever their origin, it is desirable to remove these artifacts. If they have low enough levels, then they may be removed by squelch processing. The trouble with conventional squelch processing is that it is not done in pairs and so it may actually create additional asymmetries, and it will likely destroy left-right level relationships that are needed for a subsequent mirror-image thresholding step to work properly.

Processing using local gate thresholds can remove larger artifacts (provided they are symmetric), but it carries a higher statistical risk, because the local gate thresholds are based on much less data; one bin value in many cases. Therefore it may be best to reserve this technique for larger artifacts and remove the smaller ones using a modified squelch algorithm that preserves left-right symmetry.

Figure 2:
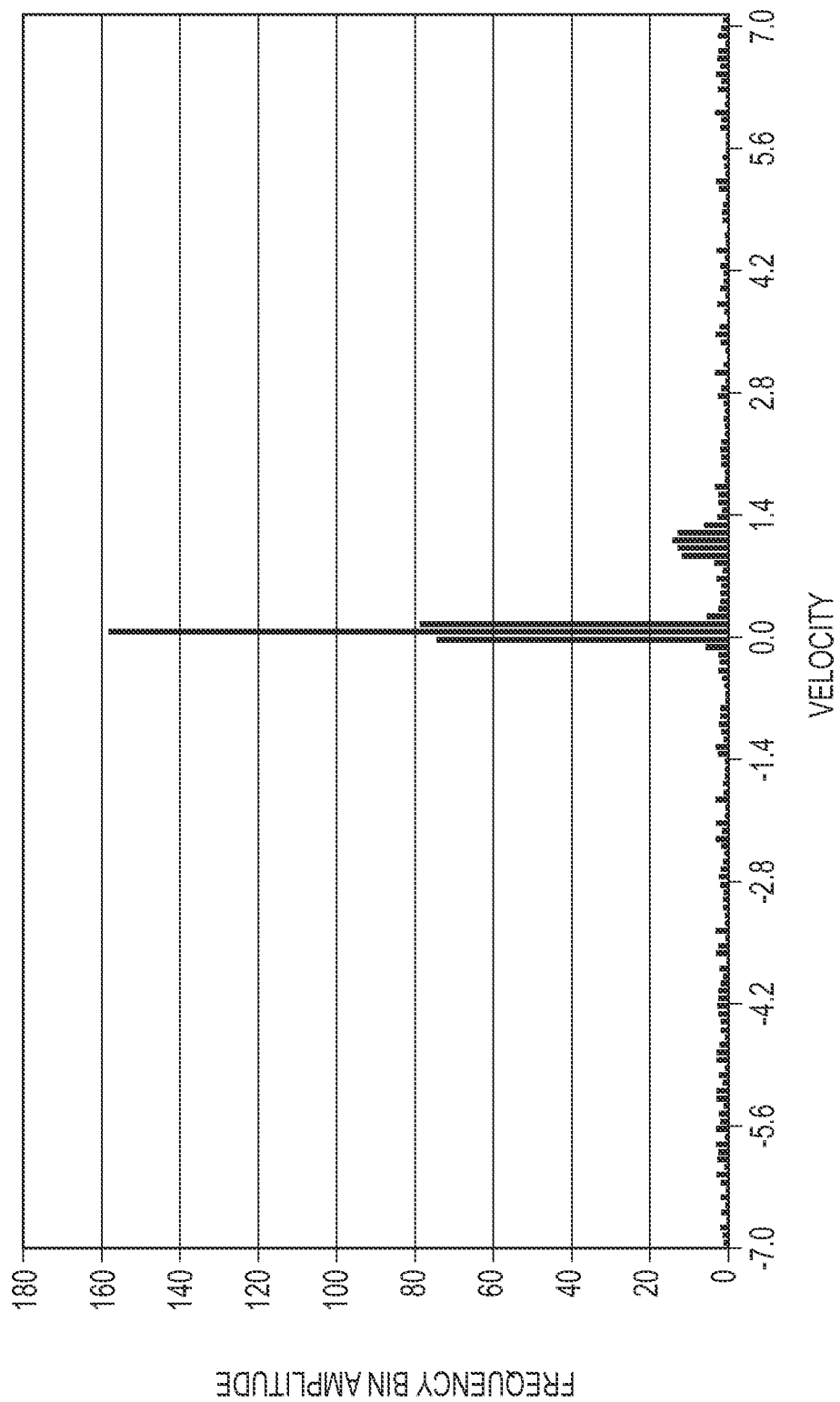
FIG. 2 shows frequency bins of an example Doppler measurement response in graph form.

FIG. 2 shows the frequency bins of an example Doppler measurement response in graph form. The graph shows the Doppler measurement response before any processing of the measurement signal. The largest frequency bin (at the 0.0 position) is the carrier wave reflection, received and measured by the Doppler sensor probe 106. It can be seen that the carrier wave dominates the frequency spectrum. A Doppler response (i.e., the Doppler-shifted return signal) can be seen to the right of the carrier wave, at about the 1.0 position. These are the only two significant responses and the rest of the frequency bins contain only noise or other artifacts.

Because the Doppler measurement feature will appear on only one side of the carrier wave bin, then the smaller amplitude in a velocity spectrum bin pair can be determined to be noise or an artifact and not a significant measurement value. This can be seen in the figure, wherein the frequency bins 1.0 to 1.3 on the right of the carrier wave bin substantially contain the Doppler measurement values, while the corresponding left frequency bins −1.0 to −1.3 on the left side contain only small amounts of noise or artifacts.

In some implementations, the spectrum may be circularly rotated, with the carrier position being in the left-most bin, for example. The bins can be re-ordered before processing, such as by using the "fftshift" function available in MATLAB, for example.

Referring again to FIG. 1, the storage system 120 can include a Doppler measurement signal 121, a spectrum routine 122, a plurality of frequency bins 123, a global squelch processing routine 124, a local gate processing routine 125, a flow statistic calculation routine 126, a plurality of local gate thresholds 127, a global squelch threshold 128, and an isolated bin routine 129.

The Doppler measurement signal 121 can comprise a measurement signal received from the sensor probe 106, for example. The Doppler measurement signal 121 can comprise one or more analog or digital flow measurements, such as a Doppler frequency shift measurement that may reflect velocities of stationary or moving objects. The Doppler measurement signal 121 typically comprises both Doppler-shifted spectral components and stationary spectral components.

The spectrum routine 122 generates a two-sided velocity spectrum from the Doppler measurement. The spectrum routine 122 in some embodiments can perform a Fast Fourier Transform (FFT) on the Doppler measurement signal 121, although other techniques can be employed, as previously discussed. The spectrum routine 122 therefore can convert the Doppler measurement into a frequency domain representation. The frequency domain representation can comprise a set of amplitudes in predetermined frequency ranges or bands. For example, the spectrum routine 122 can create a frequency response that comprises a plurality of discrete values stored in the plurality of frequency bins 123. At least a portion of the plurality of velocity spectrum bin pairs can be subsequently processed using a global squelch threshold and a plurality of local gate thresholds, as discussed below. However, it should be understood that additional thresholds are contemplated and are within the scope of the description and claims.

The plurality of frequency bins 123 comprise a plurality of discretely spaced digital frequency bins. Each bin of the plurality of frequency bins 123 can store a numerical amplitude value reflecting the presence (and relative strength) or absence of a return signal within that particular frequency range of the velocity spectrum. The plurality of frequency bins 123 can include any predetermined number of frequency bins, as desired.

The processing system 112 in some embodiments is configured to identify a carrier wave bin or bins (and therefore a carrier wave position) in the plurality of discrete frequency bins. The carrier wave divides the digital frequency spectrum into a two-sided frequency spectrum. The two-sided frequency spectrum includes a plurality of left frequency bins and a plurality of corresponding/matching right frequency bins. The two-sided frequency spectrum comprises a two-sided velocity spectrum that distinguishes spectral elements.

It should be understood that the two-sided frequency spectrum preserves flow direction information after the carrier wave bin has been determined Determination of the carrier wave position enables the discrimination of the Doppler measurement response and a measurement signal amplitude can be extracted therefrom. In many embodiments, the carrier bin will have a fixed position. In some embodiments, the actual carrier location is midway between two bin centers, and so the carrier wave frequency response can occupy one or more adjacent frequency bins.

Further, the location of the Doppler measurement response can determine the flow direction. For example, if the measurement signal is located to the right of the carrier wave frequency bin, then the fluid is moving substantially toward the sensor probe 106. If the fluid is moving substantially away from the transmitted beam or waves from the sensor probe 106, then the Doppler measurement response will be to the left of the carrier wave frequency bin. Some embodiments may reverse this convention.

The processing system 112 in some embodiments is configured to remove the carrier wave from the frequency spectrum. After the one or more carrier wave bins have been determined from among the plurality of discrete frequency bins, the amplitude of the carrier wave is subtracted or zeroed out in order to remove the carrier wave. Of course, the one or more carrier wave bin positions should be noted or recorded for other processing operations.

The Doppler measurement instrument 100 receives and processes a Doppler measurement signal in order to produce a Doppler measurement. The Doppler measurement can include a fluid flow velocity. The Doppler measurement can include a fluid flow direction.

The Doppler measurement instrument 100 generates a two-sided velocity spectrum using the spectrum routine 122. The spectrum routine 122 further generates the plurality of frequency bins 123 and the amplitude values therein. The Doppler measurement instrument 100 processes the two-sided velocity spectrum to reduce or eliminate noise, wherein a better Doppler measurement is subsequently produced by the Doppler measurement instrument 100.

The processing operates on symmetric frequency bins. By symmetric it is meant a pair of frequency bins located at equal distances to the left and right of the carrier wave location.

Some bin pairs may contain symmetric artifacts, having substantially equal amplitudes in both bins. Such symmetric artifacts may be caused by outside noise, spurious reflections, etc. If an artifact is non-symmetric and therefore is present on only one side of the carrier wave, it may not be removable by local gate processing. Instead, a non-symmetric artifact may be removed by global squelch processing. But if the artifact is symmetric and is present on both sides of the carrier wave bin or bins, then the symmetric spectral artifact carries no velocity information and can be deleted from both sides of the frequency spectrum, i.e., from corresponding bins on either side of the carrier wave bin or bins. As a result, non-measurement information can be eliminated from the frequency spectrum, making the discrimination of a velocity value easier and more accurate.

In some embodiments, the interface 101 is configured to receive a Doppler measurement signal and the processing system 112 is coupled to the interface 101 and receives the Doppler measurement signal. The processing system 112 is configured to generate a two-sided velocity spectrum including a plurality of discrete frequency bins from the Doppler measurement signal, with the two-sided velocity spectrum distinguishing spectral elements. The processing system 112 is configured to global squelch process one or more velocity spectrum bin pairs against a global squelch threshold, with the velocity spectrum bin pairs being substantially symmetrically located about one or more carrier wave bins. The processing system 112 is configured to local gate process the one or more velocity spectrum bin pairs against a plurality of local gate thresholds. Each local gate threshold of the plurality of local gate thresholds is processed against a corresponding velocity spectrum bin pair.

The processing preferably includes a global squelch thresholding and a local gate thresholding. Preferably, the global squelch thresholding is performed first, followed by the local gate thresholding. However, the local gate thresholding can be done first, in alternative embodiments.

In some embodiments, the global squelch thresholding and the local gate thresholding may be followed by isolated bin removal processing that removes isolated bins. The isolated bin removal can remove isolated bins left by, or created by, the thresholding operations.

The Doppler measurement instrument 100 executes the global squelch processing routine 124 in order to perform the global squelch thresholding on the plurality of frequency bins 123. The global squelch processing routine 124 may create the global squelch threshold 128. Bin pairs on one side of the two-sided velocity spectrum, or a subset thereof, are used to generate the global squelch threshold. The global squelch processing routine 124 may process left and right velocity spectrum bin pairs of the plurality of frequency bins 123 against the global squelch threshold 128. Individual bin pairs are compared to the global squelch threshold. The global squelch thresholding accepts or changes a velocity spectrum bin pair based on the amplitude of the two bin values with respect to the global squelch threshold. The global squelch thresholding will be discussed below in conjunction with FIGS. 7-9 and FIGS. 18 and 19.

The Doppler measurement instrument 100 executes the local gate processing routine 125 in order to perform the local gate thresholding on the plurality of frequency bins 123. The local gate processing routine 125 may create the plurality of local gate thresholds 127. The local gate processing routine 125 may process left and right velocity spectrum bin pairs of the plurality of frequency bins 123 against the plurality of local gate thresholds 127.

The local gate thresholding operates over individual bin pairs. Each bin pair is used to create a local gate threshold for that bin pair. Each bin pair is compared to its local gate threshold and one or both bin values may be changed as a result. However, since the global squelch thresholding may have already occurred, it is possible that both the left and right bins of a velocity spectrum bin pair may already be negligible in value.

For either type of thresholding, where a bin or bins fail the threshold, then either hard or soft thresholding may be employed. In the preferred embodiment, hard thresholding is used for global squelch thresholding, although soft thresholding may be used in alternative embodiments. In the preferred embodiment, soft thresholding is used for local gate thresholding, although hard thresholding may be used in alternative embodiments.

The flow statistic calculation routine 126 can use various measurements, known values, and determined values to calculate flow statistics. For example, the flow statistic calculation routine 126 can determine a fluid level, a fluid flow direction, and a fluid flow velocity in some embodiments. Further, the flow statistic calculation routine 126 can determine a fluid flow rate in some embodiments. It should be understood that other fluid measurements and fluid characteristics are contemplated and are within the scope of the description and claims The Doppler measurement instrument 100 executes the isolated bin routine 129 in order to identify and process any isolated bins in the plurality of frequency bins 123. The isolated bin routine 129 can examine each bin in order to find isolated bins. The isolated bin routine 129 can process bins that are determined to be isolated. The processing can include zeroing out any bins that are determined to be isolated.

Figure 3A:
FIG. 3A shows an example bin pair before a hard thresholding operation, where the left bin amplitude is less than a threshold and the right bin amplitude exceeds the threshold.
Figure 3B:
FIG. 3B shows the bin pair where the left bin amplitude has been zeroed out through hard thresholding.

FIG. 3A shows an example bin pair before a hard thresholding operation, where the left bin amplitude is less than a threshold and the right bin amplitude exceeds the threshold. FIG. 3B shows the bin pair where the left bin amplitude has been zeroed out through hard thresholding. The hard thresholding operation will not change the right bin amplitude, as the right bin exceeds the threshold. In hard thresholding, only the bin that fails the threshold is changed. The threshold may be either a global squelch threshold or a local gate threshold.

Figure 4A:
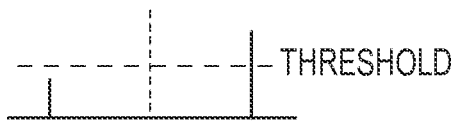
FIG. 4A shows an example bin pair before a first embodiment of a soft thresholding operation, where the left bin amplitude is less than a threshold and the right bin amplitude exceeds the threshold.

FIG. 4A shows an example bin pair before a first embodiment of a soft thresholding operation, where the left bin amplitude is less than a threshold and the right bin amplitude exceeds the threshold.

Figure 4B:
FIG. 4B shows the bin pair where the left bin amplitude has been zeroed out and where the right bin amplitude has had the smaller bin amplitude (b) subtracted therefrom due to the soft thresholding.

FIG. 4B shows the bin pair where the left bin amplitude has been zeroed out and where the right bin amplitude has had the smaller bin amplitude (b) subtracted therefrom due to the soft thresholding.

Figure 5A:
FIG. 5A shows an example bin pair before an alternative, second embodiment of a soft thresholding operation, where the left bin amplitude is less than a threshold and the right bin amplitude exceeds the threshold.

FIG. 5A shows an example bin pair before an alternative, second embodiment of a soft thresholding operation, where the left bin amplitude is less than a threshold and the right bin amplitude exceeds the threshold.

Figure 5B:
FIG. 5B shows the bin pair where the left bin amplitude has been zeroed out and where the right bin amplitude has had the threshold value (t) subtracted therefrom due to the soft thresholding.

FIG. 5B shows the bin pair where the left bin amplitude has been zeroed out and where the right bin amplitude has had the threshold value (t) subtracted therefrom due to the soft thresholding. In some embodiments, the threshold value (t) can comprise the smaller bin amplitude multiplied by the predetermined multiplier factor k. It should be understood that a negative value will not be allowed, and in the event that subtraction produces a negative value, the negative value will be replaced by zero. It should be understood that the amount subtracted during soft thresholding can comprise any predetermined value, including various combinations of the smaller bin value, the predetermined multiplier factor k, or other values.

The global squelch threshold 128 can formed in any manner. The global squelch threshold 128 can be formed by averaging certain non-measurement bins (typically on the non-flow side of the spectrum, see FIG. 20(d), for example). The global squelch threshold 128 can be set as a predetermined fraction of a selected spectral peak value, such as the carrier wave peak value in some embodiments, or might be the asymmetric peak value, or some combination thereof. For example, once the flow direction has been identified, then frequency bins on a non-Doppler-signal side of the carrier wave bin or bins can be averaged together in order to generate a global squelch threshold value.

Averaging off-side bin values and scaling the result to form a noise estimate is a strategy advocated by Petroff (U.S. Pat. No. 7,672,797). Because the noise bin amplitudes may have non-Gaussian statistics, a more robust strategy (when numerous noise bins are available) is to form the global squelch threshold from the peak value seen among the noise bin amplitudes. The global squelch threshold 128 thus will be highly representative of the average amount of noise in the frequency spectrum. The non-Doppler-signal side can be identified as the side of the velocity spectrum having a lesser energy content. The global squelch threshold 128 can be subsequently used for processing at least a portion of the frequency bins. It should be understood that all velocity spectrum bin pairs can be processed, if desired, wherein the processing zeroes out (or reduces) the non-Doppler bin pairs.

Alternatively, the global squelch threshold can be derived from the velocity spectrum in other ways. For example, the global squelch threshold can comprise a predetermined percentage or portion of a spectral peak in the velocity spectrum, such as a percentage or portion of a Doppler-shifted reflection. This might be the carrier peak value. Alternatively, it could be an asymmetric peak value. In another alternative, the global squelch level can be computed from each spectral peak in the velocity spectrum and a lowest value may be chosen as the global squelch threshold. It should be understood that the global squelch threshold can be formed or derived from any part of the velocity spectrum and can comprise any amplitude level.

FIG. 6A shows an example bin pair before a global squelch thresholding operation, where both the left bin amplitude and the right bin amplitude are less than the global squelch threshold.

FIG. 6B shows the bin pair where both the left bin amplitude and the right bin amplitude have been zeroed out for failing to exceed the global squelch threshold.

FIG. 7A shows an example bin pair before a global squelch thresholding operation, where the left bin amplitude is less than the global squelch threshold and the right bin amplitude exceeds the global squelch threshold.

FIG. 7B shows the bin pair unchanged, as the global squelch processing will not zero out a single bin and create an asymmetry in the bin pair.

FIG. 8A shows an example bin pair before a global squelch thresholding operation, where both the left bin amplitude and the right bin amplitude exceed the global squelch threshold.

FIG. 8B shows the bin pair unchanged.

It can be seen from the above examples that the global squelch processing can be implemented wherein both frequency bins are either kept or changed. The global squelch processing preferably does not change only a single bin of a velocity spectrum bin pair. If one or both bins exceed the global squelch threshold, then neither bin is changed. Only when both bins of a velocity spectrum bin pair are less than the global squelch threshold are the bins changed, and then both bins are zeroed out. This rule is followed in order to avoid creating asymmetries in the velocity spectrum.

The plurality of local gate thresholds 127 comprises one or more local gate threshold values determined by the Doppler measurement instrument 100. The plurality of local gate thresholds 127 in some embodiments comprises an array of local gate threshold values, providing a local gate threshold for each velocity spectrum bin pair in the plurality of frequency bins 123.

The plurality of local gate thresholds 127 can be formed in any manner. For example, the left and right bins of a velocity spectrum bin pair can be compared, wherein the lesser bin value is used to generate the local gate threshold. The local gate threshold 127 therefore comprises a noise-versus-signal threshold, wherein any frequency bin amplitude above the gate threshold is left untouched, as a possible informational signal, but wherein all frequency bin amplitudes at or below the local gate threshold 127 can be zeroed out in some embodiments in order to remove noise or other spurious artifacts. Other methods can be used to determine each local gate threshold 127 and are within the scope of the description and claims, such as using a predetermined minimum or default gate threshold value.

In some embodiments, the local gate threshold can be further changed, such as through multiplication with a predetermined multiplier factor k. The resulting local gate threshold therefore can be larger than the lesser bin value from which it is formed. As a result, where the left and right bin values of a velocity spectrum bin pair are relatively close in value, then the greater bin value may also be zeroed out in some cases (see FIGS. 10-11 and the accompanying discussion below).

In some embodiments, the processing is characterized by each local gate threshold 127 being further modified by averaging a particular local gate threshold with the weighted values of predetermined nearby local gate thresholds prior to adjusting the frequency bin amplitudes. This provides more uniform local gate thresholds and reduces local gate threshold outliers. The predetermined nearby local gate thresholds can include adjacent local gate thresholds on either side of the frequency bin in question, multiple adjacent local gate thresholds on either side of the frequency bin in question, or even nearby local gate thresholds that are not literally adjacent, such as local gate thresholds one or more bins to either side of the frequency bin in question.

Consequently, the local gate threshold does not have to be of the same amplitude as the smaller bin value. The bin amplitude can be adjusted for the local gate threshold in order to ensure that the larger bin amplitude is zeroed out (in the case that it is larger than the smaller bin amplitude but not larger than the local gate threshold).

In some embodiments, the processing system 112 is configured to iteratively determine a plurality of local gate thresholds for the plurality of velocity spectrum bin pairs. In some embodiments, the processing system 112 is configured to modify each local gate threshold by averaging the local gate threshold with weighted values of one or more nearby local gate thresholds.

Figure 9A:
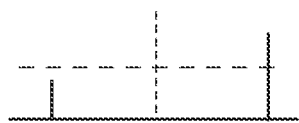
FIG. 9A shows an example bin pair before a local gate thresholding operation, where the left bin amplitude is less than the local gate threshold and the right bin amplitude is greater.

FIG. 9A shows an example bin pair before a local gate thresholding operation, where the left bin amplitude is less than the local gate threshold and the right bin amplitude is greater. This will typically occur where the smaller bin amplitude is used as the local gate threshold.

Figure 9B:
FIG. 9B shows the bin pair where the left (i.e., smaller) bin amplitude has been zeroed out for failing to exceed the local gate threshold.

FIG. 9B shows the bin pair where the left (i.e., smaller) bin amplitude has been zeroed out for failing to exceed the local gate threshold.

By definition, unless the two bins are exactly the same, there will be a smaller bin. In local gate processing, the smaller bin will always be zeroed out.

Figure 10A:
FIG. 10A shows an example bin pair before a local gate thresholding operation, where the left bin amplitude is less than the local gate threshold and the right bin amplitude is greater.

FIG. 10A shows an example bin pair before a local gate thresholding operation, where the left bin amplitude is less than the local gate threshold and the right bin amplitude is greater.

Figure 10B:
FIG. 10B shows the bin pair where the left bin amplitude has been zeroed out for failing to exceed the local gate threshold and the right bin amplitude has been reduced.

FIG. 10B shows the bin pair where the left bin amplitude has been zeroed out for failing to exceed the local gate threshold and the right bin amplitude has been reduced. This is an example of soft thresholding, wherein the right bin amplitude can be reduced by the smaller (left) bin amplitude in some embodiments. Alternatively, the right bin amplitude can be reduced by the local gate threshold value or other predetermined value.

Figure 11A:
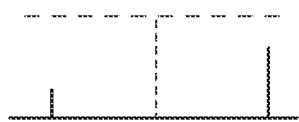
FIG. 11A shows an example bin pair before a local gate thresholding operation, where both the left bin amplitude and the right bin amplitude are less than the local gate threshold.

FIG. 11A shows an example bin pair before a local gate thresholding operation, where both the left bin amplitude and the right bin amplitude are less than the local gate threshold. This may occur where the local gate threshold comprises the smaller bin amplitude multiplied by the predetermined multiplier factor k. Consequently, the local gate threshold may be greater than both bins, especially where the predetermined multiplier factor k is relatively large.

Figure 11B:
FIG. 11B shows the bin pair where the left bin amplitude has been zeroed out for failing to exceed the local gate threshold and the right bin amplitude has also been zeroed out.

FIG. 11B shows the bin pair where the left bin amplitude has been zeroed out for failing to exceed the local gate threshold and the right bin amplitude has also been zeroed out. Here, the left and right bins are considered to be similar enough in size to be considered identical. In this manner, depending on the size of the local gate threshold, the local gate thresholding may eliminate bin pairs having substantially identical amplitudes. By definition, two bins symmetrically located about the carrier wave location and having substantially identical values do not contain Doppler signal information and can be removed.

Notice that there is no case where both bins are greater than the local gate threshold. That is because the local gate threshold is the same size or larger than the lesser bin amplitude (or comprises one bin amplitude where they are exactly the same).

FIG. 11 shows a local gate thresholding example where the two bin values are substantially the same and as a result, both bin values are zeroed out. In embodiments where the predetermined multiplier factor k is used, the larger bin value may end up being less than the local gate threshold. In this case, the local gate thresholding will treat the two bin values as being substantially identical.

In some embodiments, the global squelch threshold 128 is substituted for a local gate threshold 127 if the global squelch threshold 128 is greater than the local gate threshold 127. By greater in value, it is meant that the global squelch threshold 128 has a greater amplitude/magnitude.

In some embodiments, the global squelch threshold 128 can override the local gate thresholds 127. For example, in some embodiments the global squelch threshold 128 is substituted for a local gate threshold 127 if the global squelch threshold 128 is greater than the local gate threshold 127 (see steps 1805-1806 of FIG. 18). Alternatively, in other embodiments the global squelch thresholding may be done first, and then the local gate thresholding.

Figure 12:
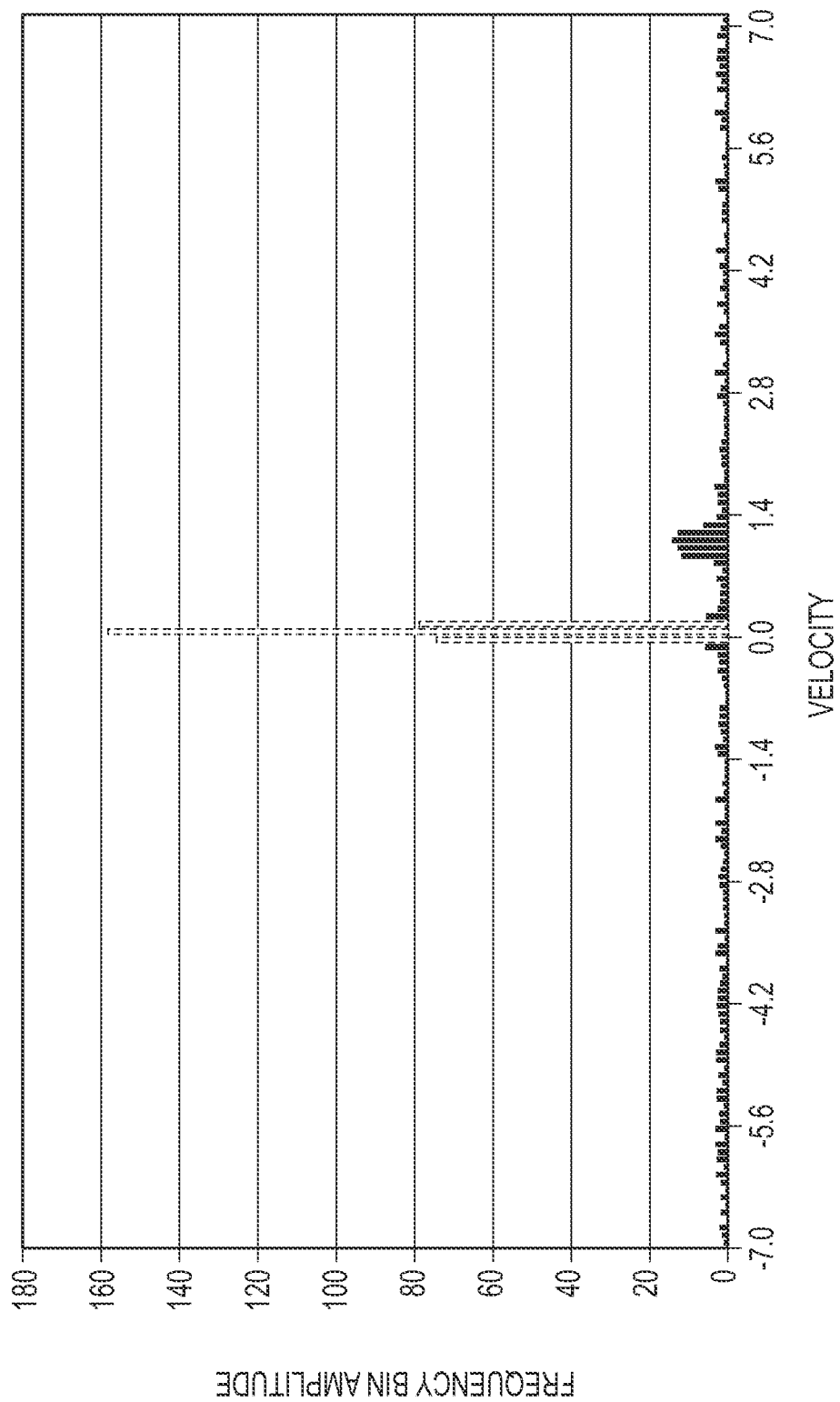
FIG. 12 shows the frequency bins of FIG. 2 after the carrier wave frequency bin or bins have been determined and removed.

FIG. 12 shows the frequency bins of FIG. 2 after the carrier wave frequency bin or bins have been determined and removed (i.e., zeroed out). Because the carrier wave signal is often the largest and contains the most energy in the frequency spectrum, removal of the carrier wave response removes spectral energy that can influence or impair a measurement determination.

FIG. 12 also shows an example of symmetric spectral artifact removal from the plurality of frequency bins according to an embodiment of the invention. This example operates on the frequency bins to the immediate left and right of the carrier wave. If both bins are less than the global squelch threshold, then both bins will be zeroed out by the global squelch processing. Here, where the two bins are large in value, they will be unlikely to be less than the global squelch threshold and will not be affected by the global squelch processing.

Instead, the two bins may be removed by the local gate processing. Here where the immediate left and right bins are within a predetermined symmetry threshold of each other, then they can be determined to be substantially symmetric, as can be seen from the graph. Where one bin is smaller, even if only marginally smaller, and where the smaller bin value is multiplied by a predetermined multiplier factor k to form the local gate threshold, then the larger bin may also be less than the local gate threshold. In this case, both bins may be zeroed out by the local gate processing. The dashed lines show their subsequent removal according to the invention.

Figure 13:
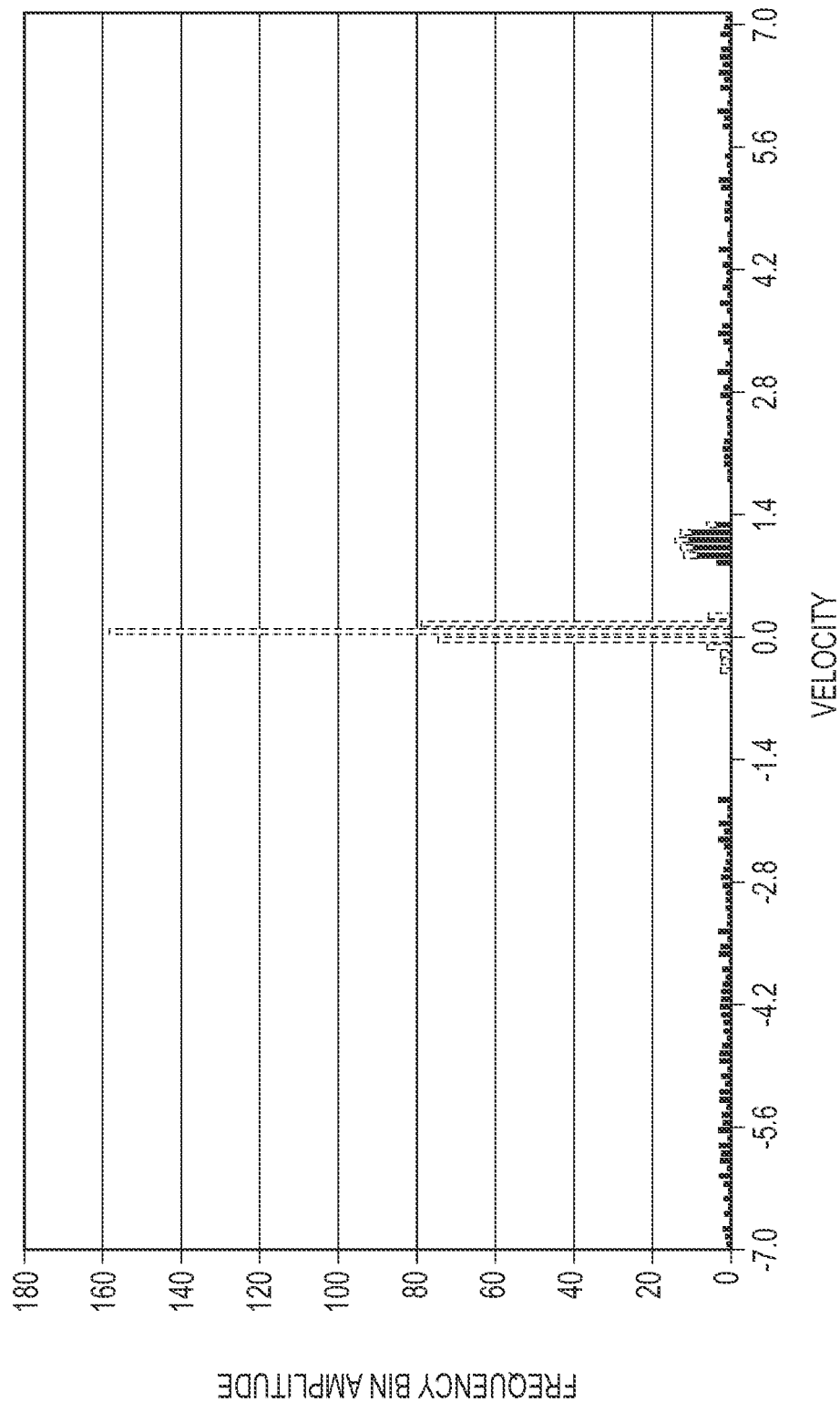
FIG. 13 shows examples of partial noise removal from the plurality of frequency bins according to an embodiment of the invention.

FIG. 13 shows examples of partial noise or artifact removal from the plurality of frequency bins according to an embodiment of the invention. In this figure, only a portion of the processing has been completed. Here, the frequency bins symmetrically located to the left and right of the carrier wave frequency bin are processed and noise amplitude values are removed from the plurality of frequency bins. Further, the frequency bins around the carrier that have marginal amplitudes have been zeroed out according to applicable thresholds. Moreover, the frequency bins on either side of the Doppler measurement response have been zeroed out where they were substantially symmetric.

Referring again to FIG. 13, the graph shows a soft thresholding. The soft thresholding has been performed on the frequency bins 1.0 to 1.3 to the right of the carrier wave in the Doppler measurement response. As a result, the passing frequency bins (i.e., bins that exceed a predetermined gate threshold multiplied by a predetermined multiplier factor k) are also reduced by a predetermined amplitude amount, such as by the opposite bin amplitudes, for example. In some embodiments, the frequency bin to be reduced is not reduced or affected by the predetermined multiplier factor k, and the predetermined multiplier factor k is used merely for the comparison of the frequency bin to the gate threshold. Alternatively, the passing frequency bins can be reduced by a gate threshold amount multiplied by a predetermined multiplier factor k, as previously discussed. This can be done in addition to the zeroing out of the frequency bins that did not exceed the gate threshold.

Figure 14:
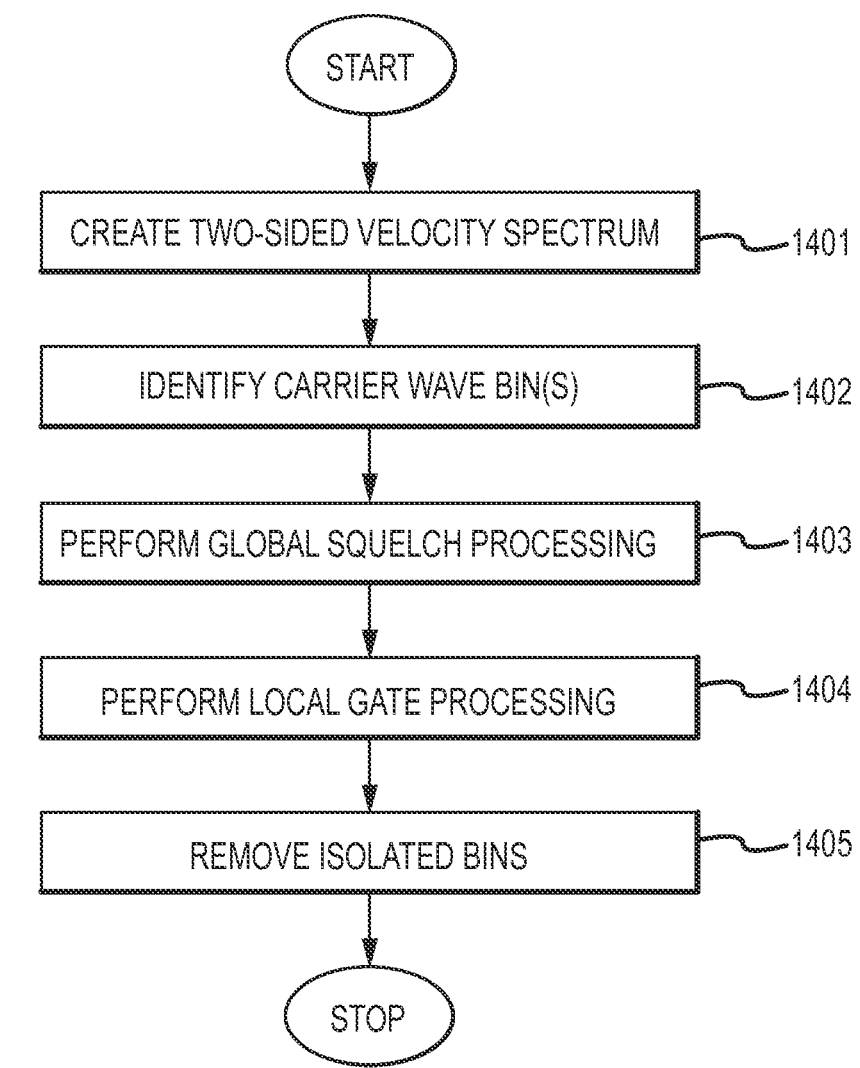
FIG. 14 is a flowchart of a method for processing a Doppler measurement according to the invention.

FIG. 14 is a flowchart 1400 of a method for processing a Doppler measurement according to the invention. In step 1401, a two-sided velocity spectrum is created from the Doppler measurement. The two-sided velocity spectrum includes a plurality of discrete frequency bins. The two-sided velocity spectrum distinguishes spectral elements and various spectral elements may be present in the plurality of frequency bins. The two-sided velocity spectrum can be created from any manner of Doppler measurements, such as a fluid flow velocity measurement, for example. The Doppler measurement can comprise an analog or digital measurement. Creating the two-sided velocity spectrum can include performing a fast Fourier transform (FFT), for example, wherein the fast Fourier transform creates a plurality of discrete frequency bins, such as bins of digital values, for example. The FFT process produces complex values ($X_i$). To use these complex values, the method may compute either a $|X_i|$ magnitude spectrum or a $|X_i|^2$ power spectrum. Each frequency bin of the plurality of frequency bins comprises a portion of the two-sided velocity spectrum. The frequency bands of the spectrum can be substantially similar in size or can vary as desired. But if the bands vary in size, it is necessary that their sizing be symmetrical about the carrier position.

In step 1402, one or more carrier wave bins are identified out of the plurality of discrete frequency bins of the two-sided velocity spectrum. All subsequent processing will start one or more bins to either side of the carrier wave bin or bins. The one or more carrier wave bins can comprise the carrier wave frequency employed in the Doppler measurement. Consequently, the one or more carrier wave bins comprise a reception of the original carrier wave and are not needed or important in the velocity measurement determination. However, it is important to know the carrier wave location, as the carrier location divides the frequency spectrum into the two-sided spectrum, including left frequency bins on the left side of the one or more carrier wave bins and right frequency bins on the right side of the one or more carrier wave bins. The location of the one or more carrier wave bins can be stored or otherwise noted.

In some embodiments, the carrier wave determination can include the removal or subtraction of the carrier wave amplitude from the one or more carrier wave bins and from the frequency spectrum. This can be done because the carrier wave is not part of the flow velocity measurement determination.

In step 1403, global squelch processing is performed on the two-sided velocity spectrum. The global squelch processing employs a single global squelch threshold, as previously discussed. The global squelch processing can generally reduce or eliminate non-symmetric artifacts in the velocity spectrum.

If both bin values of a velocity spectrum bin pair are less than the global squelch threshold, then that velocity spectrum bin pair is zeroed out. Both bins are left unchanged if either or both frequency bin amplitudes exceed the global squelch threshold. Alternatively, if the sum or average of both frequency bin amplitudes exceeds the global squelch threshold, then again both frequency bins may be left unchanged.

Hard thresholding may be applied to both bins during global squelch processing; either both frequency bins are kept or both are zeroed out. The key is to process a symmetrically located pair of bins at the same time.

In step 1404, local gate processing is performed on the two-sided velocity spectrum. The local gate processing employs a plurality of local gate thresholds, including a local gate threshold for each velocity spectrum bin pair. The local gate processing in some embodiments is performed after the global squelch processing. This step always zeroes out one or both bins of a velocity spectrum bin pair. It may keep the larger bin value, but the local gate processing never keeps both.

For local gate thresholding, soft thresholding may be better suited, but hard thresholding may also be used. The comparison of a bin value to a local gate threshold can comprise a comparison of the bin value to the local gate threshold multiplied by the predetermined multiplier factor k. Soft thresholding replaces the larger bin value with the value of [max(L, R)−min(L,R)], and, in the case of local gate processing, zeroes out the smaller bin value. Preferably, it does not include the predetermined multiplier factor k. However, the comparison can be [max(L,R)>k*min(L,R)] in some embodiments. Here, L and R represent the left and right bin values respectively.

An alternative comparison may be based on the average and absolute difference of L and R, the left and right bin values of a velocity spectrum bin pair: $|d|>k'*c$, where $d=(R-L)$, where $c=\frac{1}{2}(R+L)$ and where $k'=2(k-1)/(k+1)$.

It should be understood that the processing steps 1403 and 1404 can be iteratively performed, wherein a bin pair can be selected and the global squelch processing and the local gate processing are performed on the selected bin pair. Then a next bin pair can be selected and processed. Consequently, the processing can be iteratively performed until a predetermined portion (or all) of the frequency spectrum and plurality of frequency bins have been processed.

It should be understood that not all of the frequency bins are required to be processed, for example. The method can include an iteration check, wherein a predetermined number of frequency bins can be processed. Alternatively, the frequency bins can be processed until a predetermined goal is achieved. For example, the processing can be performed outwardly from the carrier wave bin until a Doppler measurement feature is either encountered or passed. The Doppler measurement feature may have to be passed or exceeded by a predetermined number of frequency bins, for example. Consequently, the processing can remove noise or other artifacts up to and around the Doppler measurement feature, but it is not necessarily required that the entire frequency spectrum be processed. Unprocessed bins may be set to zero.

In optional step 1405, isolated bins are processed and removed in some embodiments. The bins may be processed using an isolated bin removal rule, wherein isolated bins can be zeroed out and therefore removed from the two-sided velocity spectrum. The isolated bin removal may remove isolated bins that are left after the global squelch processing and the local gate processing, wherein these two processing steps may leave isolated bins untouched in the velocity spectrum. In addition, the two threshold processing steps may create isolated bins.

The isolated bin removal rule can specify how many nearby bins are considered for removing an isolated bin. The isolated bin removal rule can specify the amplitude levels of nearby bins for removing an isolated bin. The amplitude of the bin under consideration may also be a factor in the isolated bin removal rule, in some embodiments.

The isolated bin removal rule can assess nearby bin levels individually or as a group (i.e., an immediately adjacent bin to the bin being processed can be treated as being much more important, if desired).

Figure 15:
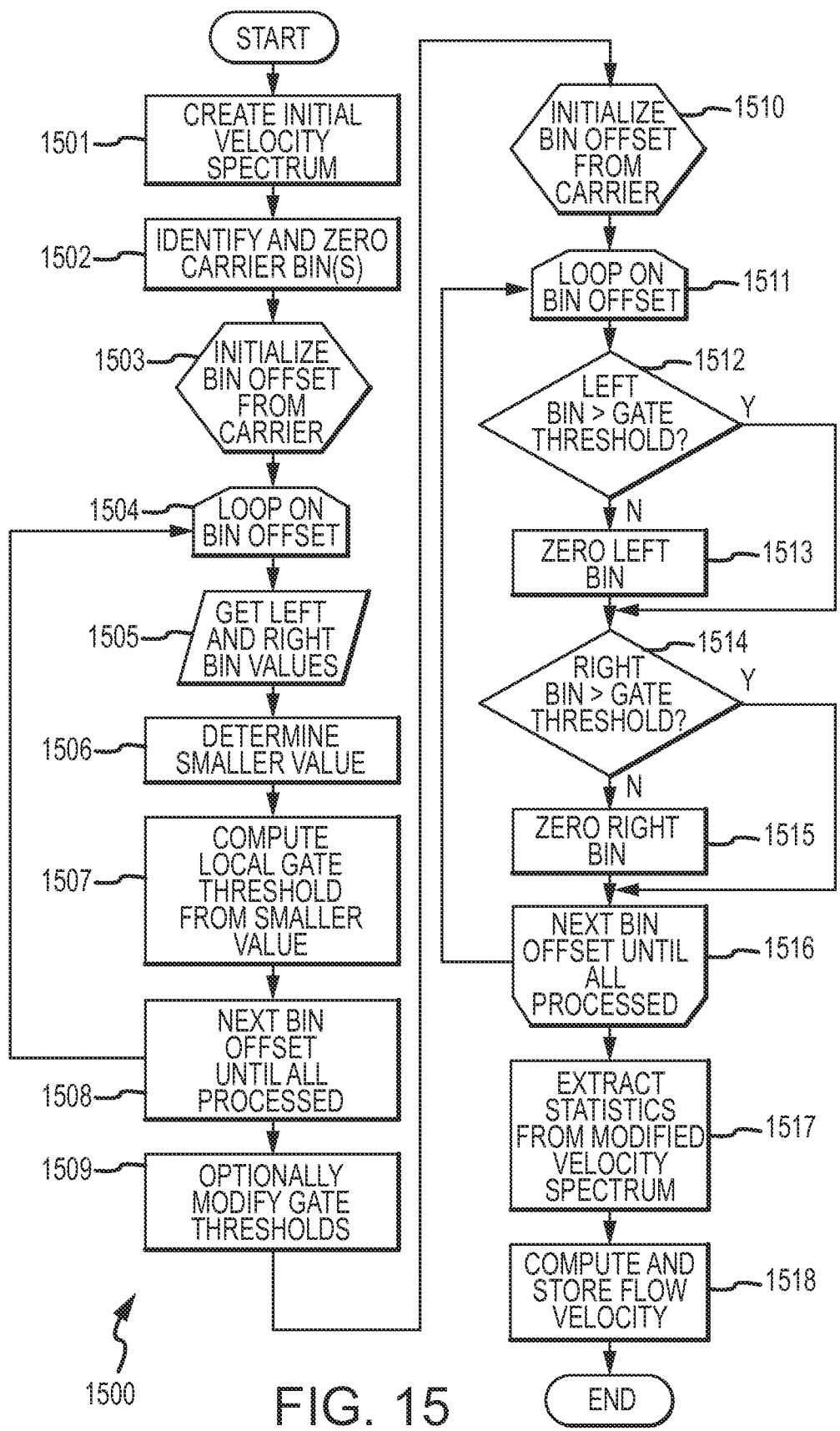
FIG. 15 is a general processing flow diagram according to the invention.

FIG. 15 is a general processing flow diagram 1500 according to the invention. In step 1501, the two-sided velocity spectrum is created from the Doppler measurement, as previously discussed.

In step 1502, the one or more carrier wave bins are identified. The location(s) may be stored for further use.

In step 1503, a bin offset from the carrier frequency is initialized. This may be done where the processing proceeds from outside left and right bin locations and moves inwards. Or it may be done where the processing proceeds outwards, but skips some few bins hear the carrier position.

In step 1504, a bin index is used to perform iterative processing. The bin index can be derived from the bin offset at the beginning of the processing.

In step 1505, left and right bin values are obtained for the current bin index.

In step 1506, the left and right bin values are compared and the smaller bin value is determined.

In step 1507, a local gate threshold is computed from the smaller bin value. The local gate threshold may represent a minimum energy level in a frequency bin and may be used for eliminating non-signal amplitude values. In some embodiments, the local gate thresholds can be multiplied by a predetermined multiplier factor k that increases the threshold level.

In step 1508, the bin index is iterated and the method loops back to step 1504 until all desired velocity spectrum bin pairs are processed to produce a plurality of local gate thresholds. The processing of a plurality of velocity spectrum bin pairs will therefore generate a plurality of local gate thresholds. If the end of iteration has been reached, then the method proceeds on to step 1509.

In step 1509, the plurality of local gate thresholds may be optionally modified. For example, in some embodiments the local gate thresholds can be smoothed by averaging them with nearby local gate thresholds. In some embodiments, individual local gate thresholds may be replaced by a global squelch threshold when the latter is larger than the particular local gate threshold.

In step 1510, the bin offset from the carrier frequency is again initialized.

In step 1511, the bin index is again initialized from the bin offset. The bin index can again be used to perform iterative processing.

In step 1512, the left bin value is compared to the local gate threshold. If the left bin value is greater than the local gate threshold for the velocity spectrum bin pair, then the method jumps to step 1514. Consequently, the left bin value is not changed. Conversely, if the left bin value is not greater than the local gate threshold, then the method proceeds to step 1513.

In step 1513, the left bin value is zeroed out. Because the left bin value is less than the local gate threshold, the left bin value is considered to be too small to comprise useful spectral information.

In step 1514, the right bin value is compared to the local gate threshold. If the right bin value is greater than the local gate threshold for the velocity spectrum bin pair, then the method jumps to step 1516. Consequently, the right bin value is not changed. Conversely, if the right bin value is not greater than the local gate threshold, then the method proceeds to step 1515.

In step 1515, the right bin value is zeroed out. Because the right bin value is less than the local gate threshold, the right bin value is considered to be too small to comprise useful spectral information.

In step 1516, the bin index is iterated and the method loops back to step 1511 until all desired velocity spectrum bin pairs are processed against the local gate thresholds. The processing of a plurality of velocity spectrum bin pairs will therefore generate a plurality of local gate thresholds. If the end of iteration has been reached, then the method proceeds on to step 1517.

In step 1517, the modified velocity spectrum is processed to extract useful statistics, including identifying a Doppler reflection in the two-sided velocity spectrum. The processing can further determine a Doppler offset comprising a frequency offset of the Doppler reflection from the carrier frequency. The frequency offset can be used to determine a flow velocity. The processing can further determine whether the Doppler reflection is on the left side of the two-sided velocity spectrum (i.e., to the left of the carrier frequency) or on the right side.

In step 1518, the frequency offset and the spectrum side can be processed to determine a flow velocity and flow direction from the Doppler measurement. The determined values can be stored, displayed, or transmitted to other devices.

Figure 16:
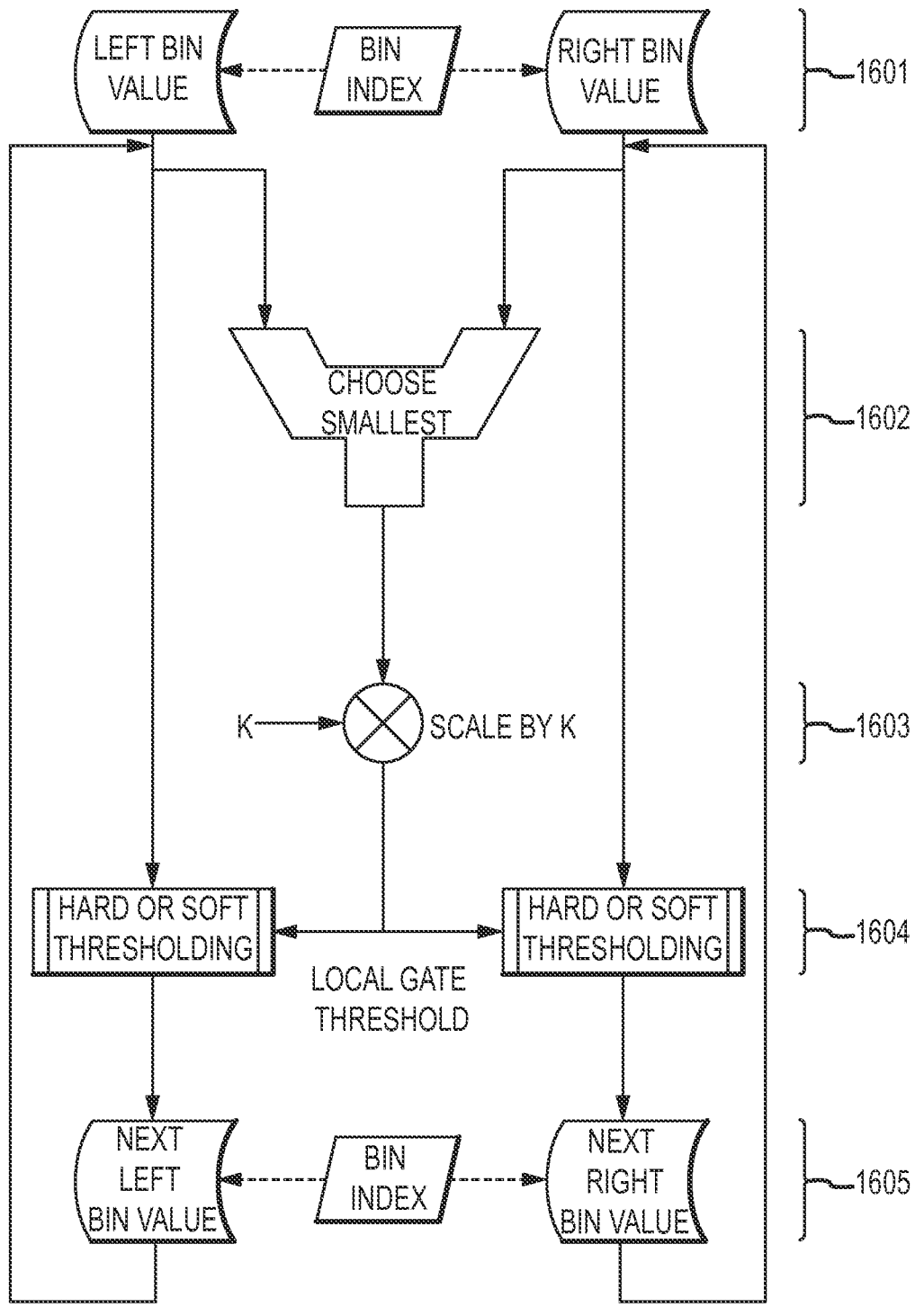
FIG. 16 is a velocity spectrum bin pair processing flow diagram according to the invention.

FIG. 16 is a velocity spectrum bin pair processing flow diagram 1600 according to the invention. The processing flow diagram 1600 is further detail of steps 1504-1509 of FIG. 15. The processing flow diagram 1600 is an embodiment of the local gate processing wherein a local gate threshold comprises a smaller bin value multiplied by a predetermined multiplier factor k, as previously discussed. In step 1601, a left bin amplitude and a right bin amplitude are obtained. These amplitude values may be obtained by using a bin index, for example.

In step 1602, the left and right amplitude values are compared and the smaller bin amplitude is chosen.

In step 1603, the smaller bin amplitude is multiplied by a predetermined multiplier factor k. The predetermined multiplier factor k can be used to modify the smaller bin amplitude for any subsequent comparison and/or thresholding operation. The predetermined multiplier factor k in some embodiments increases the smaller bin amplitude (i.e., k>1).

In step 1604, the modified smaller bin value is used as a local gate threshold. The modified smaller bin value can be used for hard thresholding, as previously discussed. The modified smaller bin value can be used for soft thresholding, as previously discussed. Consequently, one or both of the left bin value and the right bin value may be changed during the thresholding operation. By design, at least one bin will be zeroed out in this step. The other bin may be zeroed, reduced, or left unchanged.

In step 1605, the next bin pair (i.e., a next left bin value and a next right bin value) are obtained. This can be achieved by incrementing the bin index, for example. Consequently, a plurality of bin pairs can be iteratively processed.

Figure 17:
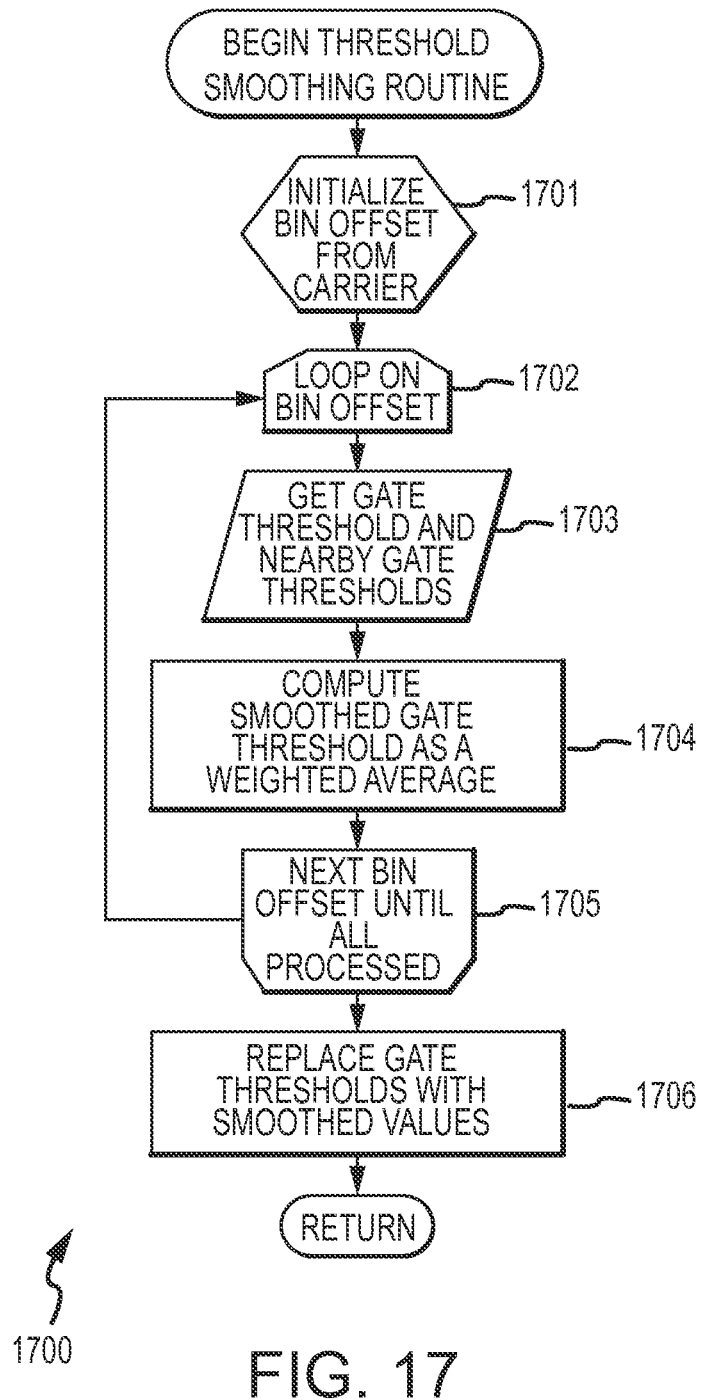
FIG. 17 is a smoothing processing flow diagram for the two-sided velocity spectrum according to the invention.

FIG. 17 is a smoothing processing flow diagram 1700 for the two-sided velocity spectrum according to the invention. In step 1701, a bin offset from the carrier frequency is initialized.

In step 1702, a bin index is used to perform iterative processing. The bin index can be derived from the bin offset at the beginning of the processing.

In step 1703, a local gate threshold is obtained and one or more predetermined nearby local gate thresholds are obtained. The number of nearby local gate thresholds may be chosen according to the desired level of smoothing being sought.

In step 1704, in some embodiments the smoothed local gate threshold is computed as a weighted average of the original local gate threshold and the one or more predetermined nearby local gate thresholds.

In step 1705, the bin index is iterated to generate a next bin index and the method loops back to step 1702 until all frequency bins/local gate thresholds have been processed.

In step 1706, the local gate threshold values are replaced with the corresponding smoothed values.

Figure 18:
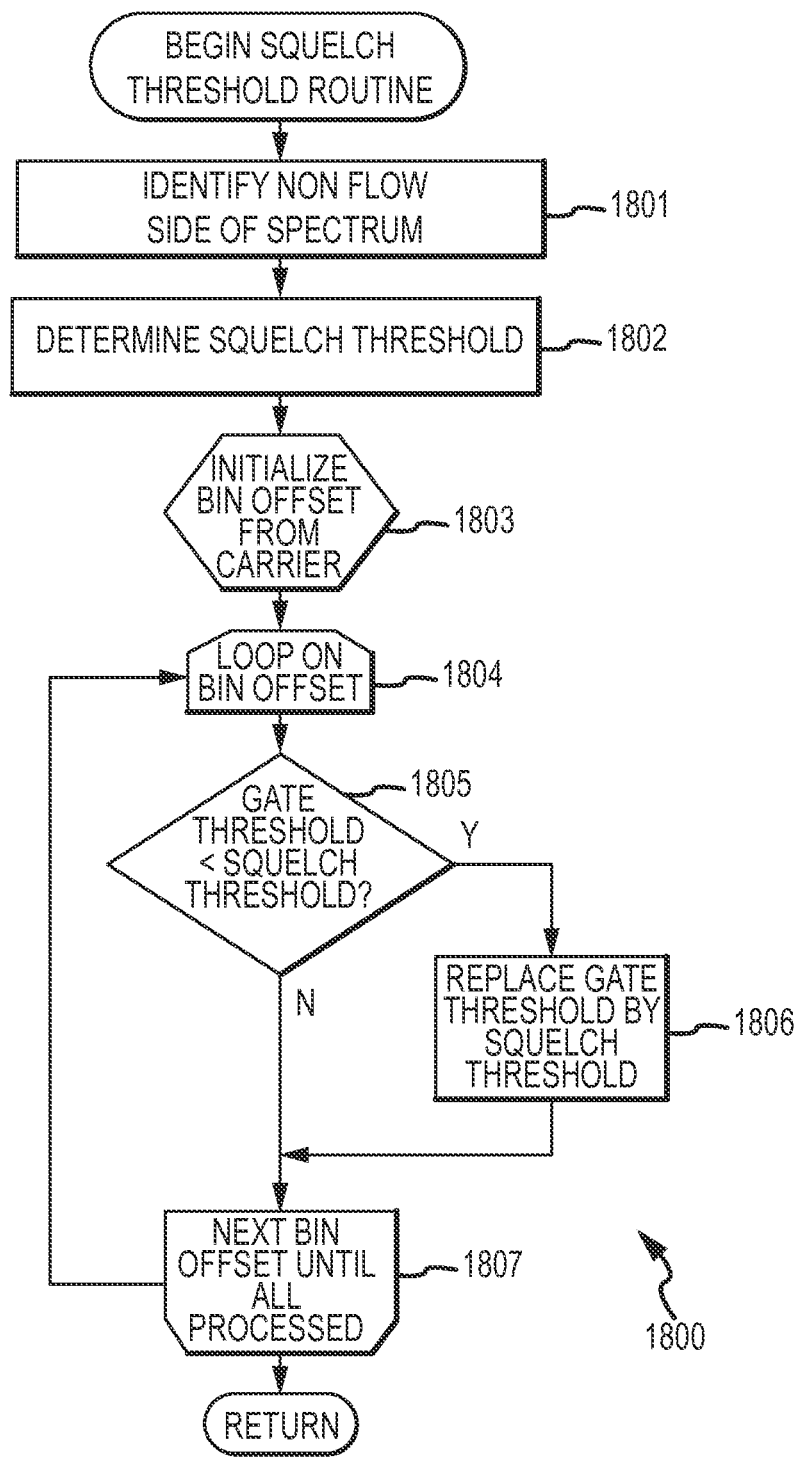
FIG. 18 is a global squelch threshold processing flow diagram for the two-sided velocity spectrum according to the invention.

FIG. 18 is a global squelch threshold processing flow diagram 1800 for the two-sided velocity spectrum according to the invention. In some embodiments, the flowchart 1800 can occur between steps 1502 and 1503 of the general operational flowchart 1500 of FIG. 15, i.e., before the local gate processing.

In step 1801, a non-flow side of the two-sided velocity spectrum is identified. The non-flow side will not have the Doppler reflection therein.

In some embodiments, the non-flow side is identified by computing amplitude totals on the left side and the right side. Then a sign percentage may be computed as $100(\Sigma R - \Sigma L)/(\Sigma R + \Sigma L)$. Here, L and R represent the respective amplitudes of the left and right bins in a pair, and the summation is carried out over most or all pairs. This provides a confidence number between −100% and +100% for the direction of the flow.

In step 1802, a global squelch threshold is determined. The global squelch threshold may be determined in some embodiments by averaging predetermined bin values on the non-flow side, as previously discussed. Not all non-flow side bins will need to be averaged in. However, the global squelch threshold may be generated in any suitable manner. Any bin values determined to comprise symmetric artifacts can be first removed, for example. Alternatively, the squelch threshold can be chosen to comprise the peak value in the off-side bins, for example, with the off-side bins comprising the spectrum side that does not include a flow measurement peak or peaks.

In step 1803, a bin offset from the carrier frequency is initialized.

In step 1804, a bin index is used to perform iterative processing. The bin index can be derived from the bin offset at the beginning of the processing.

In step 1805, each local gate threshold is compared to the global squelch threshold generated in step 1801. If the local gate threshold is less than the global squelch threshold, then the method branches to step 1806. However, if the local gate threshold is not less than the global squelch threshold, then the method proceeds to step 1807.

In step 1806, the local gate threshold, which has been determined to be less than the global squelch threshold, is replaced with the global squelch threshold. Consequently, a velocity spectrum bin pair will not be compared to a threshold value that is lower than the global squelch threshold, as the global squelch threshold is calculated to represent a non-signal energy level that is present in the non-signal side of the two-sided spectrum. The method then proceeds to step 1807.

In step 1807, the bin index is iterated until all velocity spectrum bin pairs (or local gate thresholds) are processed.

Figure 19:
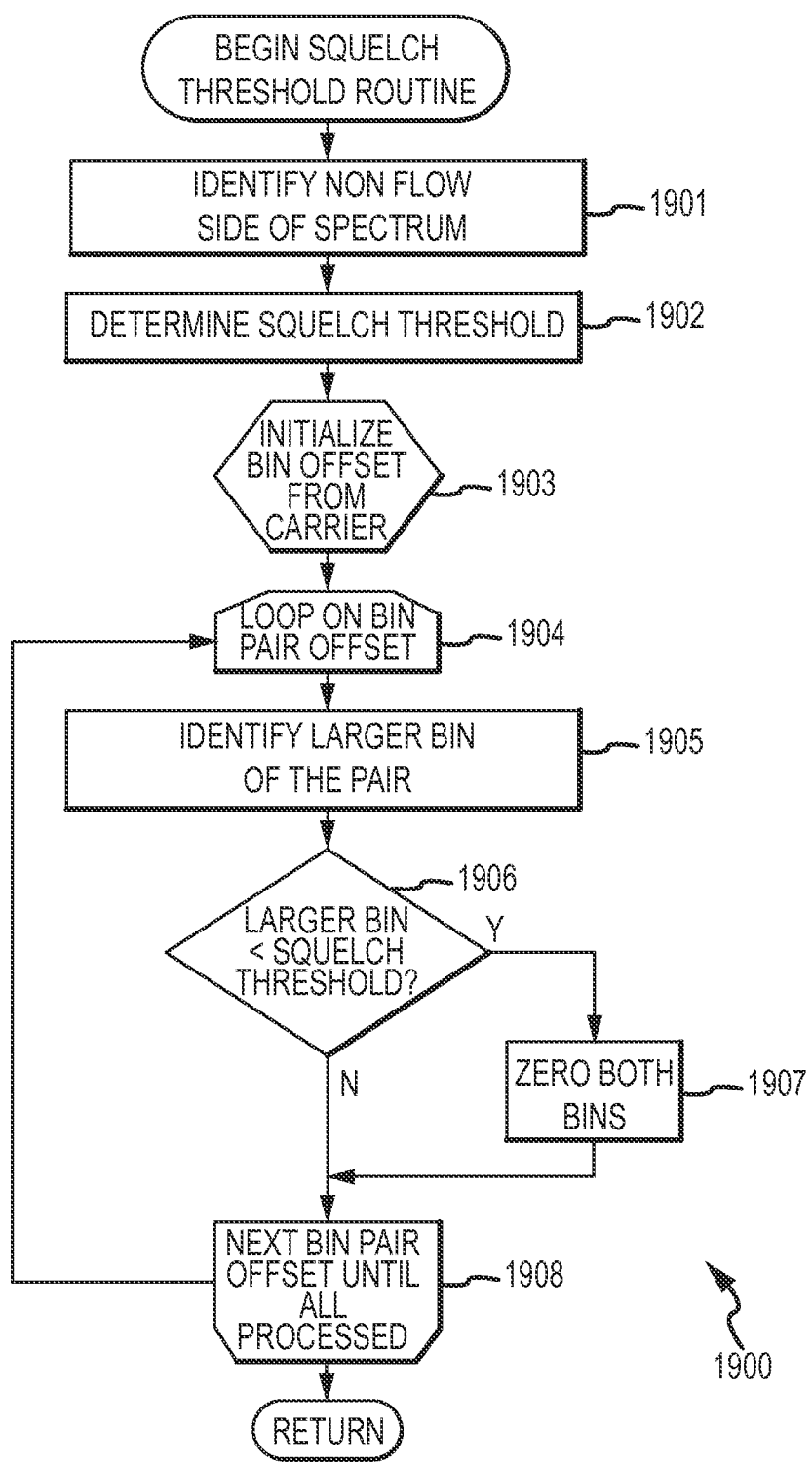
FIG. 19 is a global squelch threshold processing flow diagram for the two-sided velocity spectrum according to the invention.
Figure 20A:
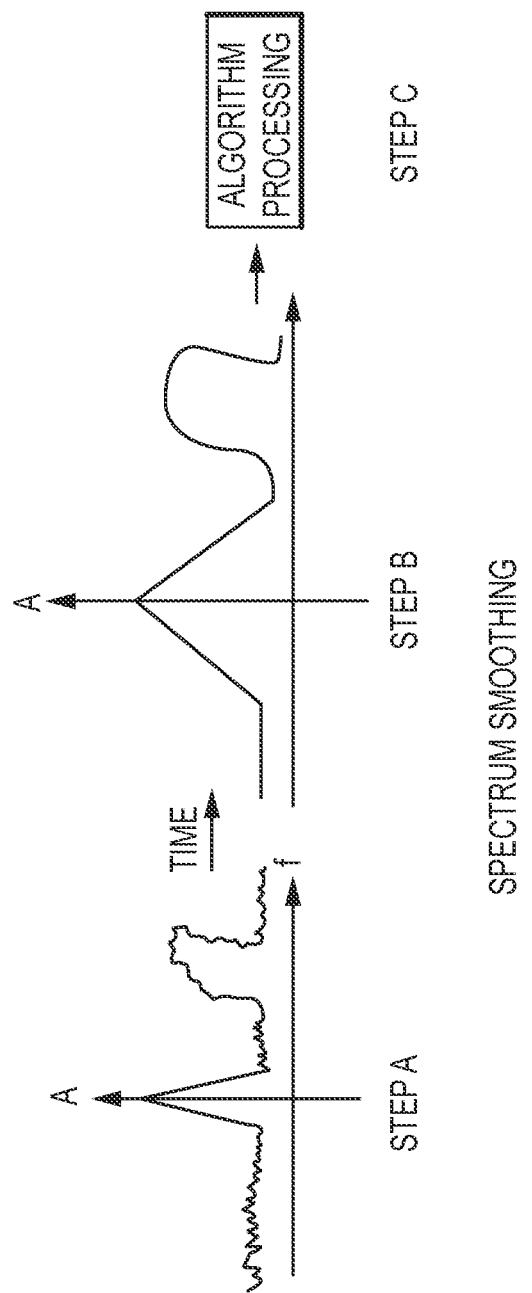
FIG. 20($a$) is an example Doppler spectrum that is compromised by noise.
FIG. 20(c) illustrates that an instrument producing a two-sided Doppler spectrum can distinguish negative flow from positive flow.
FIG. 20(d) is a spectrum showing symmetric spectral artifacts that are substantially above the noise floor.
Figure 20B:
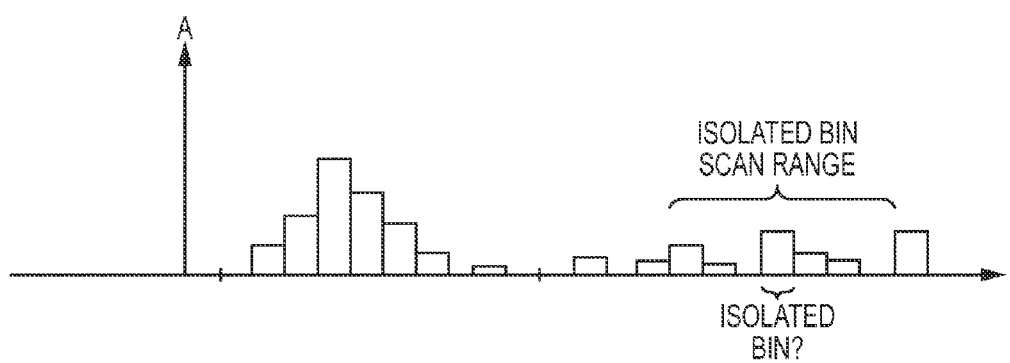
Figure 20C:
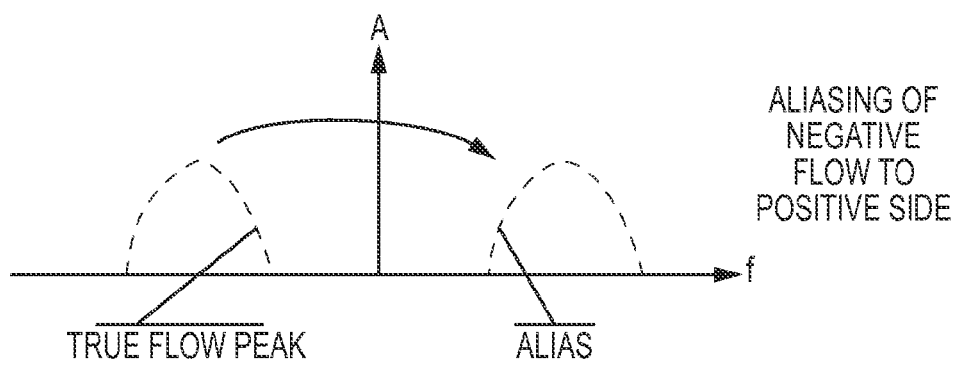
Figure 20C:
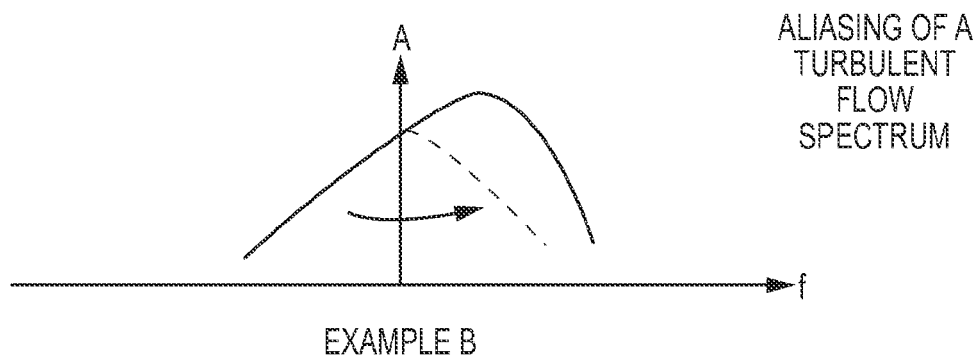
Figure 20C:
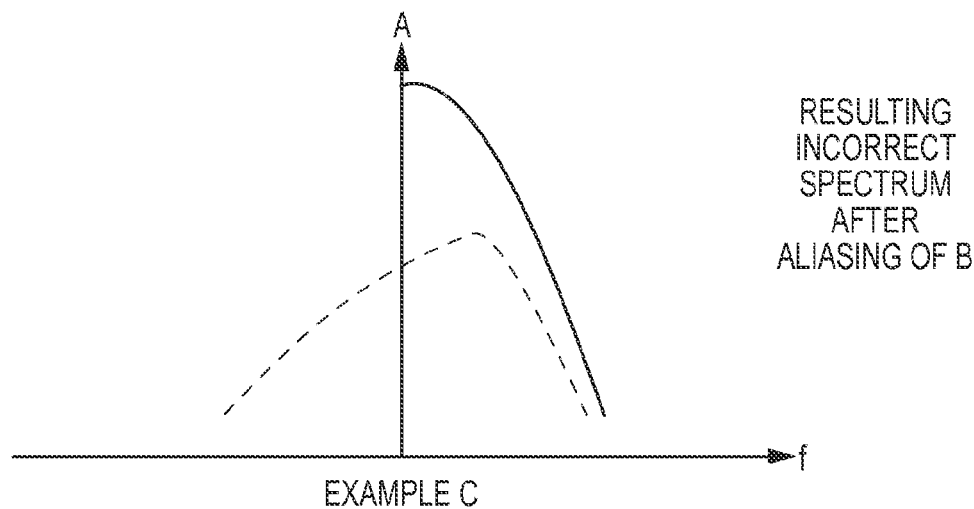
Figure 20D:
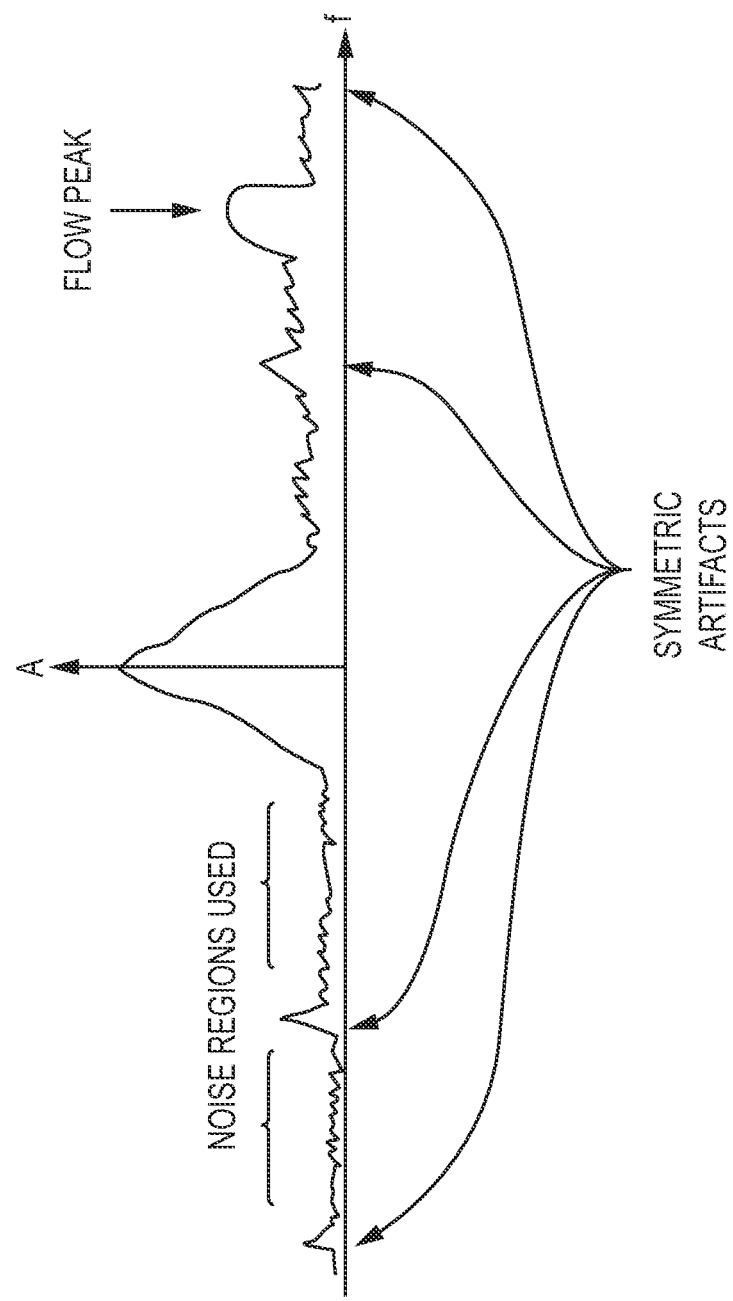

FIG. 19 is a global squelch threshold processing flow diagram 1900 for the two-sided velocity spectrum according to the invention. In some embodiments, the flowchart 1900 can occur between steps 1502 and 1503 of the general operational flowchart 1500 of FIG. 15, i.e., before the local gate processing. It should be understood that the flow diagram 1900 may be an alternate embodiment to the flow diagram 1800 of FIG. 18.

In step 1901, a non-flow side of the two-sided velocity spectrum is identified, as previously discussed.

In step 1902, a global squelch threshold is determined, as previously discussed.

In step 1903, a bin offset from the carrier frequency is initialized, as previously discussed.

In step 1904, a bin index is used to perform iterative processing, as previously discussed.

In step 1905, a larger bin value of the bin pair is identified.

In step 1906, the larger bin value is compared to the global squelch threshold generated in step 1902. If the larger bin value is less than the global squelch threshold, then the method branches to step 1907. However, if the larger bin value is not less than the global squelch threshold, then the method proceeds to step 1908 and bin amplitudes are left unchanged.

In step 1907, both bin amplitudes are zeroed out. This is done because both bin amplitudes are less than the global squelch threshold. This is the only case where the bin amplitudes are changed due to the global squelch processing, i.e., if at least one bin amplitude exceeds the global squelch threshold, then neither bin of the bin pair is changed. The method then proceeds to step 1908.

In step 1908, the bin index is iterated until all velocity spectrum bin pairs (or local gate thresholds) are processed.

Note that if a conventional (i.e., point-by-point) squelch algorithm had been applied instead of the pairwise global squelch processing of the invention, then one bin value (of a bin pair) that is less than a conventional squelch level might be eliminated while other bin of the pair, if it exceeded the conventional squelch level, would be kept. Subsequent soft thresholding in a local gate processing would be pointless, because the proper noise estimate would have been lost. Removal of a single frequency bin amplitude would create the impression of information in the other frequency bin.

A better pre-screening algorithm is to zero both frequency bins of a velocity spectrum bin pair unless their maximum or average value exceeds a squelch limit. If their maximum or average value exceeds the squelch limit, then both frequency bins are processed using local gate thresholding. However, it should be understood that any method or algorithm can be used to determine when one or both frequency bins satisfy a squelch value.

It is desirable to remove non-symmetric artifacts. If they have low enough levels, then such non-symmetric artifacts may be removed by squelch processing. The trouble with conventional squelch processing is that it is not done in pairs, and so it may actually create additional asymmetries. Further conventional squelch processing will likely destroy left-right level relationships that are needed for a subsequent local gate thresholding step to work properly. Processing using local gate thresholds can remove larger artifacts (provided they are symmetric) but it carries a higher statistical risk, because the local gate thresholds are based on much less data (one bin value, in many cases). Thus it is best to reserve local gate processing for larger (symmetric) artifacts that may survive the global squelch processing, and therefore to perform the local gate processing after removing the smaller artifacts using the squelch algorithm that preserves left-right symmetry, as is discussed above.

FIG. 20 shows examples of highly turbulent flows. FIG. 20(*a*) is an example Doppler spectrum that is compromised by noise. In some embodiments, the Step A signal can lead to false positives and/or false negatives during the thresholding step(s). In another embodiment, as shown in Step B, the spectrum is first smoothed prior to spectral thresholding operation, thus reducing the likelihood of false positives and/or false negatives.

FIG. 20(*b*) is a spectrum showing isolated bin removal where noise statistics have caused a false positive and/or false negative bin where no flow was actually present. In some embodiments, the isolated bin removal can comprise zeroing out an isolated bin according to an isolated bin removal rule. In some embodiments, the isolated bin removal can comprise a step that is performed after a thresholding step (or steps) has been performed, wherein the thresholding may leave an isolated bin that can be considered anomalous and not carrying any flow information. The isolated bin removal rule can specify how many nearby bins are considered for removing an isolated bin. The isolated bin removal rule can specify the amplitude levels of nearby bins for removing an isolated bin. The isolated bin removal rule can assess nearby bin levels individually or as a group (i.e., an immediately adjacent bin to the bin being processed can be treated as being much more important, if desired). In one embodiment, the bin is removed and/or zeroed out by noticing that there are zero or a plurality (for illustrative purposes only, in one instance it can be zero or a small number) of filled bins within a certain spectral width of the bin being tested, allowing for the removal of a false positive bin and improving instrument accuracy. As an example, the three bins to either side of a bin in question can be examined, and if none of the six bins has a bin amplitude exceeding a predetermined threshold, then the bin in question may be judged to be an isolated bin, per a given isolated bin removal rule, and may be zeroed out.

FIG. 20(*c*) illustrates that an instrument producing a two-sided Doppler spectrum can distinguish negative flow from positive flow. In an instrument producing a one-sided Doppler spectrum, these two cases are indistinguishable.

FIG. 20(*d*) is a spectrum showing symmetric spectral artifacts that are substantially above the noise floor. Because these artifacts are symmetric, they will be removed via the mirror-imaging step. In some embodiments, it is desirable that they may not be used to set the noise-floor estimate.

In some embodiments of the instrument 100, the flow estimate may be obtained by calculating a signed spectral centroid value in which the integration is carried out over symmetrically disposed regions of the frequency axis. In this manner, spectral energy to the right of the carrier will enter with a positive sign, for example, and spectral energy to the left of the carrier will enter with a negative sign. This allows for correct centroid determination of highly turbulent flows containing both positive and negative velocities.

When a two-sided Doppler spectrum is available, the mean frequency shift (relative to carrier) is computed as a signed spectral centroid. For continuous spectra, this is defined as:

$$\bar{f} = \int_{f_0-f_{max}}^{f_0+f_{max}} (f-f_0)S(f-f_0)df \bigg/ \int_{f_0-f_{max}}^{f_0+f_{max}} S(f-f_0)df \quad (1)$$

Here, S is the spectral amplitude value as a function of frequency and $f_0$ represents the carrier frequency.

In many embodiments, the spectral values are known only for a finite number of discrete bin locations. Let these bin amplitudes be given as A(n), where n is the bin number. For simplicity of notation, assume that the bins are numbered from −N to N, with n=0 denoting the carrier bin and (preferably) positive bin numbers corresponding to increasingly positive Doppler shifts. Then the formula above may be replaced by:

$$\bar{f} = \Delta f \cdot \sum_{n=1}^{N} n[A(n) - A(-n)] \bigg/ \sum_{n=1}^{N} |A(n) - A(-n)| \quad (2)$$

Here, $\Delta f$ denotes the frequency spacing between bins.

In either case, $\bar{f}$ is the mean Doppler shift and will be either positive or negative depending on the direction of flow. The mean Doppler shift may then be converted to a mean fluid velocity by means of a multiplicative conversion factor dependent upon the carrier frequency, the angle of the acoustic receiver axis relative to the flow axis, and the speed of sound. The use and calculation of this multiplicative constant is well-known to those skilled in the art.

FIGS. 20 c), ii) and iii) show examples of highly turbulent flows. The instrument 100 correctly determines the mean velocity of this flow spectrum. In contrast, a prior art instrument based on a one-sided spectrum will produce an incorrect result due to aliasing of energy from one side of the spectrum to the other.

The apparatus and method according to any of the embodiments of the invention improve Doppler flow measurements by removing unwanted spectral features such as noise, crosstalk, and zero-velocity clutter from the estimated velocity spectrum, and can perform the removal prior to subsequent processing. The apparatus and method according to any of the embodiments of the invention suppress noise energy and thereby reduce the statistical variance of subsequently calculated flow results. The apparatus and method according to any of the embodiments of the invention suppress carrier-related crosstalk and clutter elements and thereby reduce the measurement bias of subsequently calculated flow results. The apparatus and method according to any of the embodiments of the invention provide a means by which a Doppler flow meter capable of two-sided spectral analysis can provide results superior to meters which do not spectrally distinguish positive from negative flow. The apparatus and method according to any of the embodiments of the invention ignore symmetrical spectral features, as symmetrical spectral features may be caused by carrier related crosstalk, reflections from stationary objects, and broadband noise, for example. As a result, subsequent velocity processing can consider only those portions of the measurement spectrum that relate to actual fluid motion, while ignoring those that are simply noise or artifacts.

I claim:

1. An instrument, comprising:
an interface configured to receive a Doppler measurement signal; and
a processing system coupled to the interface and receiving the Doppler measurement signal, with the processing system being configured to generate a two-sided velocity spectrum including a plurality of discrete frequency bins from the Doppler measurement signal, with the two-sided velocity spectrum distinguishing spectral elements, and process one or more velocity spectrum bin pairs against a plurality of local gate thresholds, with at least one pair of the one or more velocity spectrum bin pairs being symmetrically located about one or more carrier wave bins such that bins of a symmetric pair have an equal distance from the carrier position and wherein each velocity spectrum bin pair is processed against a corresponding local gate threshold of the plurality of local gate thresholds.

2. The instrument of claim 1, with the processing system being further configured to process the one or more velocity spectrum bin pairs against a global squelch threshold, wherein if both bin amplitudes of a bin pair are less than the global squelch threshold, then both bin amplitudes of the bin pair are zeroed out and wherein if at least one bin amplitude of a bin pair exceeds the global squelch threshold, then both bin amplitudes of the bin pair are unchanged.

3. The instrument of claim 1, with the processing system being further configured to process the one or more velocity spectrum bin pairs against a global squelch threshold and with the global squelch threshold being substituted for a local gate threshold of the plurality of local gate thresholds if the global squelch threshold is greater than the local gate threshold.

4. The instrument of claim 1, with a local gate threshold of the plurality of local gate thresholds being a smaller value of left and right bin amplitudes of a bin pair.

5. The instrument of claim 1, with a local gate threshold of the plurality of local gate thresholds being derived from a smaller bin amplitude of left and right bin amplitudes of a bin pair, wherein the smaller bin amplitude is multiplied by a predetermined multiplier factor k to form the local gate threshold.

6. The instrument of claim 1, with a local gate threshold of the plurality of local gate thresholds being derived from a smaller bin amplitude selected from left and right bin amplitudes of a bin pair, wherein the local gate threshold is further averaged with weighted values of one or more predetermined local gate thresholds.

7. The instrument of claim 1, wherein a smaller bin amplitude of a bin pair is zeroed out and wherein if a larger bin amplitude exceeds the local gate threshold, then the larger bin amplitude is unchanged.

8. The instrument of claim 1, wherein a smaller bin amplitude of a bin pair is zeroed out and wherein if a larger bin amplitude exceeds the local gate threshold, then the larger bin amplitude is reduced by the smaller bin amplitude.

9. The instrument of claim 1, wherein if both bin amplitudes of a bin pair are less than the local gate threshold, then both bin amplitudes of the bin pair are reduced or zeroed out.

10. The instrument of claim 1, with the processing system (112) being further configured to zero out an isolated bin according to an isolated bin removal rule.

11. A method for processing a Doppler measurement signal, comprising:
generating a two-sided velocity spectrum including a plurality of frequency bins from the Doppler measurement signal and with the two-sided velocity spectrum distinguishing spectral elements; and processing one or more velocity spectrum bin pairs against a plurality of local gate thresholds, with at least one pair of the one or more velocity spectrum bin pairs being symmetrically located about one or more carrier wave bins such that bins of a symmetric pair have an equal distance from the carrier position and wherein each velocity spectrum bin pair is processed against a corresponding local gate threshold of the plurality of local gate thresholds.

12. The method of claim 11, further comprising processing the one or more velocity spectrum bin pairs against a global squelch threshold, wherein if both bin amplitudes of a bin pair are less than the global squelch threshold, then both bin amplitudes of the bin pair are zeroed out and wherein if at least one bin amplitude of a bin pair exceeds the global squelch threshold, then both bin amplitudes of the bin pair are unchanged.

13. The method of claim 11, further comprising processing the one or more velocity spectrum bin pairs against a global squelch threshold and with the global squelch threshold being substituted for a local gate threshold of the plurality of local gate thresholds if the global squelch threshold is greater than the local gate threshold.

14. The method of claim 11, with a local gate threshold of the plurality of local gate thresholds being a smaller value of left and right bin amplitudes of a bin pair.

15. The method of claim 11, with a local gate threshold of the plurality of local gate thresholds being derived from a smaller bin amplitude of left and right bin amplitudes of a bin pair, wherein the smaller bin amplitude is multiplied by a predetermined multiplier factor k to form the local gate threshold.

16. The method of claim 11, with a local gate threshold of the plurality of local gate thresholds being derived from a smaller bin amplitude selected from left and right bin amplitudes of a bin pair, wherein the local gate threshold is further averaged with weighted values of one or more predetermined local gate thresholds.

17. The method of claim 11, wherein a smaller bin amplitude of a bin pair is zeroed out and wherein if a larger bin amplitude exceeds the local gate threshold, then the larger bin amplitude is unchanged.

18. The method of claim 11, wherein a smaller bin amplitude of a bin pair is zeroed out and wherein if a larger bin amplitude exceeds the local gate threshold, then the larger bin amplitude is reduced by the smaller bin amplitude.

19. The method of claim 11, wherein if both bin amplitudes of a bin pair are less than the local gate threshold, then both bin amplitudes of the bin pair are reduced or zeroed out.

20. The method of claim 11, further comprising zeroing out an isolated bin according to an isolated bin removal rule.

21. A method for processing a Doppler measurement signal, comprising:

generating a two-sided velocity spectrum including a plurality of frequency bins from the Doppler measurement signal and with the two-sided velocity spectrum distinguishing spectral elements;

processing one or more velocity spectrum bin pairs against a global squelch threshold, with at least one pair of the one or more velocity spectrum bin pairs being symmetrically located about one or more carrier wave bins such that bins of a symmetric pair have an equal distance from the carrier position; and processing the one or more velocity spectrum bin pairs against a plurality of local gate thresholds, wherein each velocity spectrum bin pair is processed against a corresponding local gate threshold of the plurality of local gate thresholds.

22. The method of claim 21, further comprising substituting the global squelch threshold for a local gate threshold of the plurality of local gate thresholds if the global squelch threshold is greater than the local gate threshold.

23. The method of claim 21, further comprising zeroing out an isolated bin according to an isolated bin removal rule.

\* \* \* \* \*